(12) United States Patent
Garg

(10) Patent No.: US 7,493,381 B2
(45) Date of Patent: Feb. 17, 2009

(54) SYSTEM AND METHOD FOR PROVIDING A SERVICE

(75) Inventor: Hari Krishna Garg, Singapore (SG)

(73) Assignee: National University of Singapore, Singapore (SG)

( * ) Notice: Subject to any disclaimer, the term of this patent is extended or adjusted under 35 U.S.C. 154(b) by 593 days.

(21) Appl. No.: 10/862,888

(22) Filed: Jun. 7, 2004

(65) Prior Publication Data
US 2005/0010573 A1 Jan. 13, 2005

Related U.S. Application Data

(60) Provisional application No. 60/476,627, filed on Jun. 9, 2003, provisional application No. 60/479,857, filed on Jun. 20, 2003, provisional application No. 60/480, 220, filed on Jun. 23, 2003.

(51) Int. Cl.
G06F 15/173 (2006.01)
(52) U.S. Cl. .................. 709/223; 709/203; 709/217
(58) Field of Classification Search ................. 709/223, 709/224, 225, 203, 217, 219
See application file for complete search history.

(56) References Cited

U.S. PATENT DOCUMENTS 7,013,155 B1 * 3/2006 Ruf et al. ................... 455/466
2001/0047391 A1 11/2001 Szutu
2002/0007411 A1 1/2002 Shaked et al.
2003/0104827 A1 * 6/2003 Moran et al. ............... 455/466
2004/0043758 A1 * 3/2004 Sorvari et al. ............ 455/414.1
2006/0079211 A1 * 4/2006 Degraeve ................ 455/412.1

FOREIGN PATENT DOCUMENTS

| EP | 1 300 784 A1 | 4/2003 |
| EP | 1 311 098 A2 | 5/2003 |
| GB | 2 338 862 A | 12/1999 |
| GB | 2380897 A | 4/2003 |
| WO | WO 99 14965 A | 3/1999 |
| WO | WO 02/17135 A1 | 2/2002 |
| WO | WO 02 102016 A2 | 12/2002 |

OTHER PUBLICATIONS

International Search Report (PCT/SG2004/000170), Jul. 22, 2004.
Supplementary European Search Report for EP 04736295 dated Sep. 4, 2008.

* cited by examiner

Primary Examiner—Lashonda T Jacobs
(74) Attorney, Agent, or Firm—Harness, Dickey & Pierce, P.L.C.

(57) ABSTRACT

A method of providing a service, comprising the steps of contacting one of a plurality of server electronic addresses from a first electronic address; identifying, at the server electronic address, the first electronic address from which the contact is made; and providing a service based on a service definition depending on a combination of the server electronic address and the first electronic address, and wherein the service definition comprises one or more second electronic addresses for execution of the service.

25 Claims, 16 Drawing Sheets

| Electronic address of user | First Complete Service Description | Second Complete Service Description | ... | j-th Complete Service Description | ... | b-th Complete Service Description |
|---|---|---|---|---|---|---|
| M1 | CSD(1,1) | CSD(2,1) | | CSD(j,1) | | CSD(b,1) |
| M2 | CSD(1,2) | CSD(2,2) | ... | CSD(j,2) | | CSD(b,2) |
| ... | | | | | | |
| Mi | CSD(1,i) | CSD(2,i) | | CSD(j,i) | ... | CSD(b,i) |
| ... | | | | | | |
| Ma | CSD(1,a) | CSD(2,a) | ... | CSD(j,a) | ... | CSD(b,a) |
| Electronic address assigned to CSD | P1 | P2 | | Pj | | Pb |

500

| Electronic address of user | First Complete Service Description | Second Complete Service Description | ... | j-th Complete Service Description | ... | b-th Complete Service Description |
|---|---|---|---|---|---|---|
| M1 | CSD(1,1) | CSD(2,1) | ... | CSD(j,1) | ... | CSD(b,1) |
| M2 | CSD(1,2) | CSD(2,2) | ... | CSD(j,2) | ... | CSD(b,2) |
| ... | | | | | | |
| Mi (user initiates contact) | CSD(1,i) | CSD(2,i) | ... | CSD(j,i) This CSD is provided to Dij. | ... | CSD(b,i) |
| ... | | | | | | |
| Ma | CSD(1,a) | CSD(2,a) | ... | CSD(j,a) | ... | CSD(b,a) |
| Electronic address assigned to CSD | P1 | P2 | | Pj (electronic address at which service provider is contacted) | | Pb |

FIG.6

| Electronic address of user | First Complete Service Description | Second Complete Service Description | ... | j-th Complete Service Description | ... | b-th Complete Service Description |
|---|---|---|---|---|---|---|
| M1 | CSD(1,1) | CSD(2,1) | ... | CSD(j,i) | ... | CSD(b,1) |
| M2 | CSD(1,2) | CSD(2,2) | ... | CSD(j,2) | ... | CSD(b,2) |
| ... | | | | | | |
| Mi (knowing The CSD, System Initiates Contact with Mi) | CSD(1,i) | CSD(2,i) | ... | ← CSD(j,i) This CSD is Provided to Dij. | ... | CSD(b,i) |
| ... | | | | | | |
| Ma | CSD(1,a) | CSD(2,a) | ... | CSD(j,a) | ... | CSD(b,a) |
| Electronic address assigned to CSD | P1 | P2 | | Pj (knowing the CSD, System Initiates Contact from Pj) | | Pb |

FIG.7

| Electronic address: Mobile phone number | First Complete Service Description | Second Complete Service Description |
|---|---|---|
| 96613446 | send an SMS received from user 96613446 as email to a@b.com | send an SMS received from user 96613446 as email to c@d.com |
| 90214091 | send an SMS received from user 90214091 as email to e@f.com | send an SMS received from user 90214091 as email to g@h.com |
| Electronic Address assigned to CSD: number capable of receiving SMS | 9123 | 9124 |

FIG.8

| Electronic address: Mobile phone number | First Complete Service Description | Second Complete Service Description |
|---|---|---|
| 96613446 | For an email received for 9613446@xyz.com, sent by a@b.com, take the email text, convert it to SMS and send to 96613446 | For an email received for 966 1 3 446@xyz.com. sent by c@d.com, take the email text, convert it to SMS and send to 96613446 |
| 90214091 | For an email received for 90214091@xyz.com, sent by e@f.com, take the email text, convert it to SMS and send to 90214091 | For an email received for 90214091@xyz.com. sent by g@h.com, take the email text, convert it to SMS and send to 90214091 |
| Electronic address assigned to CSD: number capable of sending SMS | 9123 | 9124 |

FIG.9

SYSTEM AND METHOD FOR PROVIDING A SERVICE

FIELD OF INVENTION

The present invention relates broadly to a method and system for providing a service.

BACKGROUND

In telecommunication, there is a continued demand to provide a larger variety of services utilizing the infra-structure of telecommunication networks. With the continued improvement to electronic devices involved in the telecommunication infra-structure, such as computers connected to the internet and mobile phones, the potential for providing a large variety of services has been significantly increased. At the same time, one of the challenges emerging now is to provide such services in a user-friendly way.

As an example mobile phones are primarily designed for voice calling and sending short text messages (popularly known as SMS). However there is great demand for access to mobile services, such as send/receive emails from phones/fax machines, call alert, and resource management (e.g. downloading and listening of music). A large number of services have been introduced in recent times. However they are not user friendly and require user familiarity and availability of certain additional technologies, for instance General Packet Radio Service (GPRS), which may not be supported in all mobile phones.

There are problems such as the complex, time-consuming and sometimes expensive processes that users have to undergo in order to use the mobile services. In many instances, they have to do one or more of the following: (1) change phones, (2) remember complex commands, (3) pay for expensive services, (4) structure their communication in a prescribed format, and (5) spend time.

An example of a prior art for Email-to-Phone service is GB2380897, entitled "Sending Email To Mobile Phone As Text Message".

Another example of a prior art for Email-to-Phone service is GB2381998, entitled "Delivery of email to text telephone".

An example of a message retrieval service is EP1104206, entitled "Mobile Station (MS) Message Selection Identification System".

An example of a music delivery service is DE19950001, entitled "Method for the selection, transmission, and playback of pieces of music by subscribers of a digital mobile communication network".

An example of a service for sending voice emails from a mobile phone is WO02096076, entitled, "Voice Attachment To An Email Using A Wireless Communication Device".

An example for a service for sending audio file attachments in an electronic message from a telephone is U.S. Pat. No. 6,385,306, entitled, "Audio file transmission method".

An example of a service for sending text and multimedia messages to email users from a mobile phone is WO03024069, entitled, "Method And System For Handling Multi-Part Messages Sent To E-Mail Clients From Cellular Phones".

An example of a service for sending SMS/voice emails/IM from a mobile phone WO0135615, entitled, "Telephone Based Access To Instant Messaging".

An example of telephony and online communication service is CA2379741, entitled, "Instant Messaging Using A Wireless Interface".

An example of a user-to-user voice messaging service is EP1185068, entitled, "Method and apparatus for voice messaging originated by mobile terminals".

An example of a solution to a voice/fax messaging service is WO0110089, entitled, "A Method And System For Electronic Messaging".

An example of mobile phone call recording, storing and retrieving service is US2002155847, entitled, "Communications recording system".

An example of a Personalized Identification Number (PIN) based telephone service is U.S. Pat. No. 6,072,860, entitled, "Telephone apparatus with recording of phone conversations on massive storage".

An example of a mobile phone for secured recording and reproduction of phone conversation is RU2207740, entitled, "Mobile Phone With Scope For Uninterrupted Recording".

An example of a mobile set for real time recording of voice/data/video is US2004041694, entitled, "Methods of recording voice signals in a mobile set".

An example of a telephone recording service is WO02069612, entitled, "System And Method For Recording Telephone Conversations".

An example of a recording and recorded Call Retrieval service is WO02093874, entitled, "System And Method For Telephone Call Recording And Recorded Call Retrieval".

An example of a service for recording telephone conversation and user memoranda is EP1199870 entitled, "Mobile telephone recording system and method".

An example of a recurring conversation recording service is EP1113652, entitled, "Recurring conversation recording".

An example of an emergency call service solution is US2002067806, entitled, "System and method for urgent phone message delivery".

Another example of an emergency call service solution is U.S. Pat. No. 6,477,374, entitled, "Apparatus and method for calendar based call routing".

An example of a call screening service is U.S. Pat. No. 5604792, entitled, "Call screening method".

An example of call screening service with selective call acceptance is U.S. Pat. No. 5,596,627, entitled, "Call screening method using selective call acceptance".

Examples of anonymous telephone systems are WO9501037, U.S. Pat. Nos. 5,361,295, 5,768,348 and 5,623,536, where all four are entitled, "Anonymous interactive telephone system".

An example of a system involved in call forwarding service is EP0674419, entitled, "Communication system for processing caller ID information".

An example of a message notification service using email is US2001039561, entitled, "Method for notifying message reception by e-mail in voice mail system".

An example of an advertising service is CA2388418 and U.S. Pat. No. 6,381,465, both entitled, "System And Method For Attaching An Advertisement To An SMS Message For Wireless Transmission".

An example of a service for music and information delivery is WO0128183 entitled, "Method for the selection, transmission, and playback of pieces of music by subscribers of a digital mobile communication network".

An example of a service for anonymous sending of items to a physical address is US2004002903 entitled, "Electronic purchase of gods over a communications network including physical delivery while securing private and personal information of the purchasing party".

The applicant has found that each of the above prior art systems and methods suffer from inflexibility of the customized services provided and/or from complex and not user friendly authentication and/or set-up processes.

Hence, it was with knowledge of the foregoing concerns that the present invention was conceived and has now been reduced to practice.

SUMMARY

In the summary and the claims, the phrase ". . . comprises one or more of a group comprising . . ." has been used on a number of occasions. This phrase is not intended to treat the different features listed as members of the group as equivalent features. In accordance with a first aspect of the present invention, there is provided a method of providing a service, comprising the steps of contacting one of a plurality of server electronic addresses from a first electronic address; identifying, at the server electronic address, the first electronic address from which the contact is made; and providing a service based on a service definition depending on the server electronic address and the first electronic address, and wherein the service definition comprises one or more second electronic addresses for execution of the service.

Accordingly, the present invention can provide high flexibility due to the use of the first, server, and second electronic addresses in the service definition, while utilizing identification of the first electronic address at the server electronic address for authentication and purpose of determination of complete service description for the user using that first electronic address. (First address does more than authentication. It is used for determining the complete service description for the user using that first address)

The service definition may be set up by a person associated with the first electronic address.

The service definition may be set up by a person associated with the second electronic addresses.

The one or more second electronic addresses may include the first electronic address and/or the server electronic address.

The service definition may comprise one or more of a group comprising making a voice call to the one or more second electronic addresses, leaving a message at the one or more second electronic addresses, sending an email to the one or more second electronic addresses, sending an SMS to the one or more second electronic addresses, sending a fax to the one or more second electronic addresses, sending an IM to the one or more second electronic addresses; sending an MMS to the one or more second electronic addresses, making a calling card call to the one or more second electronic addresses, making an access sequence call to the one or more second electronic addresses, sending audio data to the one or more second electronic addresses, sending video data to the one or more second electronic addresses, and sending multi-media data to the one or more second electronic addresses.

The service definition may comprise one or more of a group comprising receiving a voice call from the one or more second electronic addresses, recording a message from the one or more second electronic addresses, receiving an email from the one or more second electronic addresses, receiving an SMS from the one or more second electronic addresses, receiving a fax from the one or more second electronic addresses, receiving an IM from the one or more second electronic addresses; receiving an MMS from the one or more second electronic addresses, receiving a calling card call from the one or more second electronic addresses, receiving an access sequence call from the one or more second electronic addresses, receiving audio data from the one or more second electronic addresses, receiving video data from the one or more second electronic addresses, and receiving multi-media data from the one or more second electronic addresses.

Contacting the server electronic address from the first electronic address may comprise one or more of a group comprising making a voice call to the server electronic address, sending an email to the server electronic address, sending an SMS to the server electronic address, sending a fax to the server electronic address, sending an IM to the server electronic address; sending an MMS to the server electronic address, making a calling card call to the server electronic address, making an access sequence call to the server electronic address, sending audio data to the server electronic addresses, sending video data to the server electronic addresses, and sending multi-media data to the server electronic addresses.

The service definition may comprise conversion of one communication format into another communication format.

The service definition may comprise recording a communication to and/or from the one or more second electronic addresses.

The service definition may comprise a third electronic address, and the execution of the service comprises contacting the second electronic address from the third electronic address.

The service definition may comprise a third electronic address, and the execution of the service comprises contacting the second electronic address from the third electronic address and connecting the third electronic address to the server electronic address.

Accordingly, for example anonymous calling and receiving can be performed.

In accordance with a second aspect of the present invention, there is provided system for providing a service, the system comprising an electronic device having a first electronic address; a server having associated with it a plurality of server electronic addresses; a database accessible by the server; wherein the electronic device contacts one of the server electronic addresses; the server identifies the first electronic address from which the contact is made; and the server initiates a service based on a service definition stored in the database depending on the server electronic address and the first electronic address, and wherein the service definition comprises one or more second electronic addresses for execution of the service.

The server may further comprise a user-interface unit for setting up the service definition by a person associated with the first electronic address.

The server may further comprise a user-interface unit for setting up the service definition by a person associated with the second electronic addresses.

The one or more second electronic addresses may include the first electronic address and/or the server electronic address.

The service definition may comprise one or more of a group comprising making a voice call to the one or more second electronic addresses, leaving a message at the one or more second electronic addresses, sending an email to the one or more second electronic addresses, sending an SMS to the one or more second electronic addresses, sending a fax to the one or more second electronic addresses, sending an IM to the one or more second electronic addresses; sending an MMS to the one or more second electronic addresses, making a calling card call to the one or more second electronic addresses, making an access sequence call to the one or more second electronic addresses, sending audio data to the one or more second electronic addresses, sending video data to the one or more second electronic addresses, and sending multi-media data to the one or more second electronic addresses.

The service definition may comprise one or more of a group comprising receiving a voice call from the one or more second electronic addresses, recording a message from the one or more second electronic addresses, receiving an email from the one or more second electronic addresses, receiving an SMS from the one or more second electronic addresses, receiving a fax from the one or more second electronic addresses, receiving an IM from the one or more second electronic addresses; receiving an MMS from the one or more second electronic addresses, receiving a calling card call from the one or more second electronic addresses, receiving an access sequence call from the one or more second electronic addresses, receiving audio data from the one or more second electronic addresses, receiving video data from the one or more second electronic addresses, and receiving multi-media data from the one or more second electronic addresses.

The electronic device may contact the server electronic address from the first electronic address by one or more of a group comprising making a voice call to the server electronic address, sending an email to the server electronic address, sending an SMS to the server electronic address, sending a fax to the server electronic address, sending an IM to the server electronic address; sending an MMS to the server electronic address, making a calling card call to the server electronic address, making an access sequence call to the server electronic address, sending audio data to the server electronic addresses, sending video data to the server electronic addresses, and sending multi-media data to the server electronic addresses.

The server may convert one communication format into another communication format as part of the initiating of the service.

The server may record a communication to and/or from the one or more second electronic addresses as part of the execution of the service.

The service definition may comprise a third electronic address, and the execution of the service comprises contacting the second electronic address from the third electronic address.

The service definition may comprise a third electronic address, and the execution of the service comprises contacting the second electronic address from the third electronic address and connecting the third electronic address to the server electronic address.

In accordance with a third aspect of the present invention there is provided a computer readable medium having stored thereon computer readable code means for instructing a computer controlled system to execute a method of providing a service, the method comprising the steps of contacting one of a plurality of server electronic addresses from a first electronic address; identifying, at the server electronic address, the first electronic address from which the contact is made; and providing a service based on a service definition depending on the server electronic address and the first electronic address, and wherein the service definition comprises one or more second electronic addresses for execution of the service.

BRIEF DESCRIPTION OF THE DRAWINGS

Embodiments of the invention will be better understood and readily apparent to one of ordinary skill in the art from the following written description, by way of example only and in conjunction with the drawings, in which:

FIG. 6 is a table illustrating a user initiated CSD selection from a database of CSD of an example embodiment of the present invention.

FIG. 7 is a table illustrating a system initiated CSD selection from a database of CSD of an example embodiment of the present invention.

FIG. 8 is a table illustrating the logical arrangement of a database of Complete CSD for sending SMS as Email in an example embodiment of the present invention.

FIG. 9 is a table illustrating the logical arrangement of a database of Complete Service Descriptions (CSD) of receiving email as SMS in an example embodiment of the present invention.

DETAILED DESCRIPTION OF THE INVENTION

Figure 1:
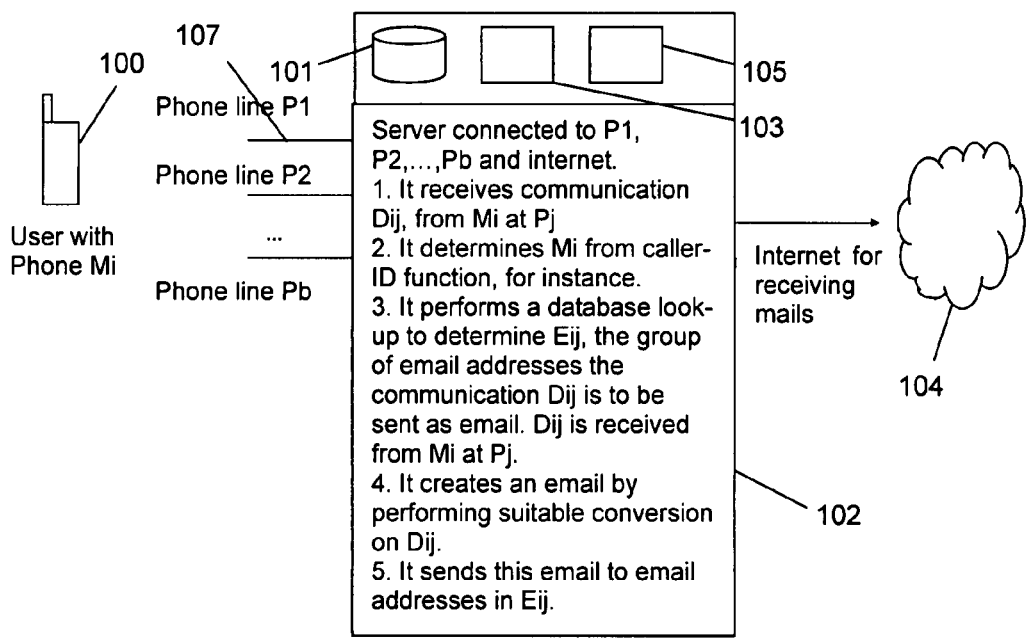
FIG. 1 is a schematic drawing illustrating an embodiment of the invention for sending Emails from a mobile phone.

The description of the present invention will begin with general definitions and description of some terms and concepts used throughout the specification and the claims.

Electronic address: This is an address that is assigned to electronic devices in the context of a telecommunication infra-structure. They include—(i) phone number (mobile or fixed-line including pagers etc), (ii) email address and instant messaging address (IM), and (iii) web-address for the websites on the internet. Electronic addresses are assigned to devices in order to facilitate communication. For the users, the i-th user will be identified by his electronic address $M_i$. Let there be 'a' users in the system, identified by their electronic addresses $M_1, M_2, \ldots, M_a$.

Communication: This can be of several types such as text, voice, multi-media and the like. It may also be possible to change the form of communication from one type to another, for instance text can be converted to speech by using text-to-speech converters. A communication occurs between two electronic addresses of the same type, phone number to phone number, SMS from a number capable of sending SMS to another number capable of receiving SMS, and so on. A communication between the same type of electronic address, say $M_i$ and $P_j$, is denoted by $D_{ij}$.

Communication transformation: A communication 'D' can be transformed to another communication 'E' by suitable techniques (text-to-speech is one such example). Other examples include (i) taking the text of the SMS and converting it to an email and (ii) taking the voice/fax message and creating an email with the voice/fax message attached to the email as an attachment in suitable format (for instance in MP3 format for voice and tiff format for fax).

Service: This is defined in context to what the consumer wishes the system to perform. Instances of service include, "send an SMS", "establish a voice call", "send an email" and the like. In general, 'S' will denote a service.

Service Provider: This is the entity that facilitates provision of the service to the user. It will send/receive communications from the user, determine the complete service description for the said communication, and process it accordingly. Service provider can provide all types of communication for a particular service depending on the nature of the complete service description. Hence in general it can send/receive all types of communication to/from all types of electronic addresses.

Service Features: Service features characterize the features of a service. For instance if the service is "make a voice call", one of its features is "the phone number to be dialed for the voice call". In this case, another feature can be "make a recording of the voice conversation". Similarly, if the service is "send an email", one of its features is "the email address to which email is sent". In this case another feature can be "the email address to which a carbon copy (cc) of the email is sent to." The features of a service S will be denoted by SF1, SF2, ..., SFc. The features of the service may depend on the service itself.

Complete Service Description. Taken together the complete service description is "S with features SF1, SF2, ..., SFc". Example of a complete service description can be "receive the communication (that is SMS in this example) sent from the mobile number 90214091 (electronic address of the user) to the mobile number 96613446 (electronic address of the service provider) and send it as email to trikaala@hotmail.com."

In general, a first example embodiment of the present invention can be described as providing user customizable communication services utilizing a telephone connection in a Telecommunication Network (e.g. Public Switched Telephone Network (PSTN), Global Service For Mobile Communications (GSM) Network, etc). Examples of some messaging services are sending and receiving SMS-to-Email/Email-to-SMS, MMS-to-Email/Email-to-MMS, Fax-to-Email/Email-to-Fax and Voice-to-Email/Email-to-Voice. Other services such as emergency calling and conference calling are described in detail later. The example embodiment for messaging services described makes sending/receiving of emails and other communications using the phones (fixed-line and mobile) as easy as making/receiving a phone call or sending/receiving a SMS (for a mobile phone). The example embodiment for messaging services further covers to sending faxes to email addresses using the ordinary fax machines. One advantage covered by the example embodiments may refer to the convenience and simplicity to manage and access communications using a fixed line/mobile phone.

In the first example embodiment of the present invention, with reference to FIG. 1, the system set-up comprises at least one mobile phone 100 (M1, M2, ..., Ma) and a server 102 that is connected to the Internet 104.

Each mobile phone 100 can make only one data/voice line connection to the server 102 at a time. There are 'a' number of users that are identified with their mobile phones M1, M2, ..., Ma.

The server 102 acts as a service control centre between the mobile phone 100 and Internet 104. It comprises a database 101, wireless and wired data transceiver 103 and a processor unit 105. It is run by a service provider providing the data/voice line connection(s) and services to the users. The server 102 provides services to the users via data/voice line connection(s) e.g. 107 corresponding to 'b' phone number(s) P1, P2, ..., Pb, where each phone number corresponds to one complete service description. The server is also connected to the Internet. As an example, the server may be computer connected to a Global System for Mobile Communications (GSM) modem with Subscriber Identification Module cards for mobile phone number(s) P1, P2, ..., Pb. For the case where the server supports SMS, as the traffic volume of SMSs go up, a direct link to a SMSC (SMS Centre) may be established to provide for the high traffic.

The database 101 is where the user electronic addresses (e.g. user mobile phone numbers) that are used for identifying the user are stored. Also stored in the database 101 is the Complete Service Description (CSD), which comprises all of the service's features. For example, a CSD can be "receive the communication sent from the mobile number 90214091 (electronic address of the user) at the mobile number 96613446 (electronic address of the service provider) and send it as email to trikaala@hotmail.com". Also stored in the database 101 is the electronic address assigned to the CSD. For example, the electronic address can be a phone number that the user needs to call to acquire a service with a specific complete service description. The detailed description of the use of the database 101 will be described later.

In this example embodiment, the server 102 provides an email sending service. At the start, the server 102 receives all communications from each of the mobile phones 100 via each corresponding data/voice line connection e.g. 107 with a specific phone number. Next, the server 102 converts the received communication into one or more emails, after which, the server 102 forwards the email(s) to the desired destination mail server(s) in the Internet 104.

For users to gain access to the email sending service, it is preferred that each of the 'a' number of users registers his mobile phone(s) 100 M1, M2, ..., Ma, with a group of one or more email addresses for each of the phone numbers P1, P2, ..., Pb. Let the group of email addresses registered under user with mobile phone 100 Mi for phone number Pj be denoted by Eij. If a user wishes to use fewer than 'b' phone numbers for the service, then they register for as many phone numbers as they wish. The process of registration is a one-time task that can be done via a web-site, email, SMS/MMS, faxing, or calling the service provider. The user with mobile phone 100 Mi may also change the email addresses in each of the groups Eij with a similar process as one used for the registration of groups. In the example embodiment of the present invention, the numbers P1, P2, ..., Pb are set to be local phone numbers for the users M1, M2, ..., Ma.

Once registered, the users can use the email sending service in the following manner.

Figure 3:
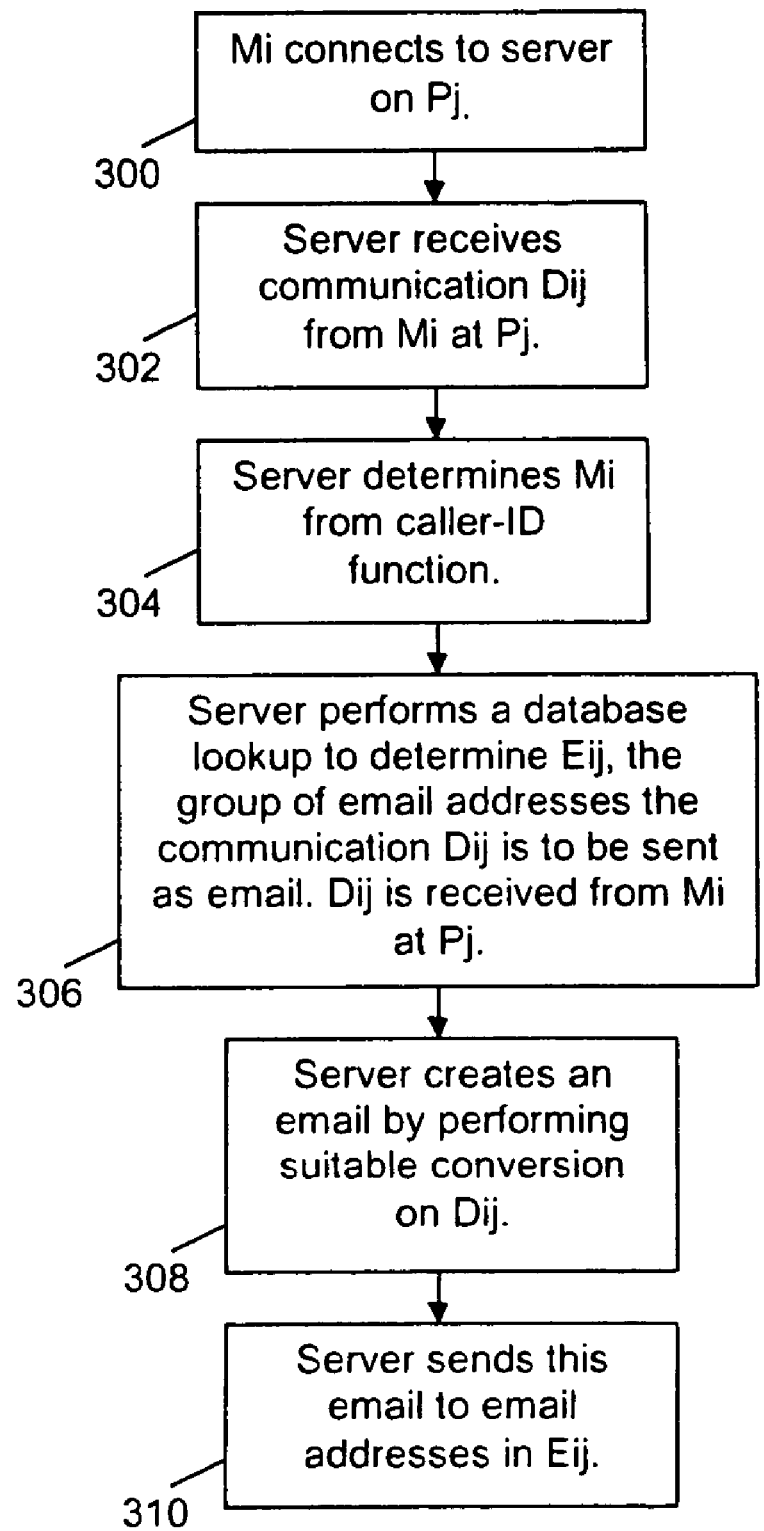
FIG. 3 is a flowchart of events for sending Emails from a mobile phone in an embodiment of the invention.

With reference to FIG. 3, a user Mi has an intention to communicate with Pj to use the emailing service corresponding to Pj. Thus, the user sends a communication, for example, by making a voice call, sending a fax, or sending an SMS/MMS through his mobile phone 100 (FIG. 1) at step 300. Let this communication be denoted by Dij.

When the server 102 (FIG. 1) is connected to the mobile phone 100 (FIG. 1) through phone number Pj, it then receives Dij in step 302 at Pj.

Next, the server 102 (FIG. 1) finds out the origin of Dij from Mi, for instance, by using caller-ID information in step 304.

Knowing Mi and Pj, the server 102 (FIG. 1) performs a database look-up to determine the group of email addresses Eij that Mi has registered for Pj, in step 306.

It then converts the communication Dij to an email Tij in step 308. Conversion of Dij to Tij may require making a recording of the voice call Dij, convert it to a file in a suitable format (say MP3) and put the file as an attachment in an email with a suitable header etc.

Then, the server 102 (FIG. 1) sends it to each of the email addresses in Eij in step 310.

Utilizing the steps above, besides mobile phones, the present invention, in various embodiments is capable of facilitating sending of emails that originate from other communication devices such as fixed line phones and fax machines.

The following shows several examples of usage scenarios of example embodiments.

In one example, the user possesses a fax machine Mi. Any fax sent from Mi to Pj (communication Dij in this context) is now sent to each of the email addresses in Eij as an attachment in a suitable format (e.g. TIFF is commonly used for fax). Thus an ordinary fax machine can be used to send a facsimile to an email account by simply dialing a local phone number. In this scenario, the server 102 receives the fax from the fax machine, attaches the fax file to an email and sends it off to destination email addresses.

In a second example, the user possesses a fixed line phone Mi. Any call made from Mi to Pj (communication Dij in this context) is now recorded and sent to each of the email addresses in Eij as an attachment in a suitable format (MP3 is commonly used for audio recording). Thus a fixed line phone can be used to send a voice message to an email account by simply dialing a local phone number in much the same way as it is used to make any other phone call. In this scenario, the server 102 receives a voice message from the fixed line phone, attaches the voice message as an MP3 file to an email and sends it off to destination email addresses.

In a third example, the user possesses a mobile phone 100 (FIG. 1) Mi. Any call made from Mi to Pj (communication Dij in this context) is now recorded and sent to each of the email addresses in Eij as an attachment in a suitable format (MP3 is commonly used for audio recording). Any SMS sent from Mi to Pj (communication Dij in this context) is now sent to each of the email addresses in Eij as a text email. Thus a mobile phone 100 can be used to send a voice (text) message to an email account by simply dialing (or sending SMS to) a local phone number in much the same way as it is used to make any other phone call (or send an SMS). In this example, the phone numbers P1, P2, . . . , Pb line configuration must be set such that it is capable of receiving phone calls as well as SMS. In this scenario, the server 102 (FIG. 1) receives a voice message from the mobile phone 100 (FIG. 1), attaches the voice message as an MP3 file respectively, to an email and sends it off to destination email addresses.

In a fourth example, the user possesses a mobile phone 100 (FIG. 1) Mi. Any SMS/MMS sent from Mi to Pj (communication Dij in this context) is now sent to each of the email addresses in Eij as a text email. Thus a mobile phone 100 (FIG. 1) can be used to send a text/picture message to an email account by simply sending an SMS/MMS much the same way as it is used to send any other SMS/MMS. In this scenario, the server 102 (FIG. 1) receives a text/picture message from the mobile phone 100 (FIG. 1), attaches the text/picture message as text/picture to an email and sends it off to destination email addresses.

If the user has a phone with a phone-book, the phone numbers P1, P2, . . . , Pb can be stored in the phone-book and dialed as such. This can eliminates the need to remember any of them.

An example embodiment utilizing the phonebook is as follows. A user registers his mobile phone (Telephone number: 96613446) for the present service and registers the email address trikaala@hotmail.com at telephone number, 67780703. The user then stores the number 67780703 in his phone-book as "EM Hari". Whenever the user wishes to send voice email to trikaala@hotmail.com, he will go to the phone-book, select "EM Hari", press the buttons on his mobile phone to call 67780703 (or an equivalent function), talk, and hang up. The system will do a caller-ID to determine the originating number 96613446. It then lookups the registration that 96613446 (calling number) has made for 67780703 (the called number) to determine the email address trikaala@hotmail.com to which the voice recording is to be sent in an email as an email attachment.

If the user Mi wishes to send separate emails to say 20 different persons, he registers their email addresses for this service, one email address for each of P1, P2, and so on and stores it as such in the phone-book (if such feature exists). The process of sending email is reduced to (i) use the phone-book to call, (ii) talk, and (iii) hang up. This invention thus provides similar convenience that the user has for making a regular voice call.

Similarly, if the user Mi wishes to send separate emails to say 20 different persons, it registers their email addresses for this service, one email address for each of P1, P2, and so on and stores it as such in the phone-book, (if such feature exists). Now the process of sending email is reduced to use the phone-book to send SMS.

In addition, in the example embodiment as described by FIG. 1, there can be a Man-Machine Interface provided on the communication device, e.g. mobile phone 100, where the user can execute "reply" to the received emails (where the email may be received by the user in SMS/MMSNoice recording/Instant Messaging format) and the reply is in the form of an SMS/voice call, which is to be sent off as an email via a phone number. An example embodiment will be described below.

What was previously described with reference to examples embodiments pertains to sending emails from a user's communication device. Now, receiving emails will be described.

The scenario is to receive an email intended for the user identified by his phone number and make the email (or its suitably modified version) available to the user at his phone in an appropriate manner.

In general, when an email is received, the system in an example embodiment checks the email addresses the email is sent to/from, extracts the email according to how the user wishes his email to be processed by the system and takes appropriate steps as per user settings and preferences to communicate the email to the user from the appropriate phone number.

Figure 2:
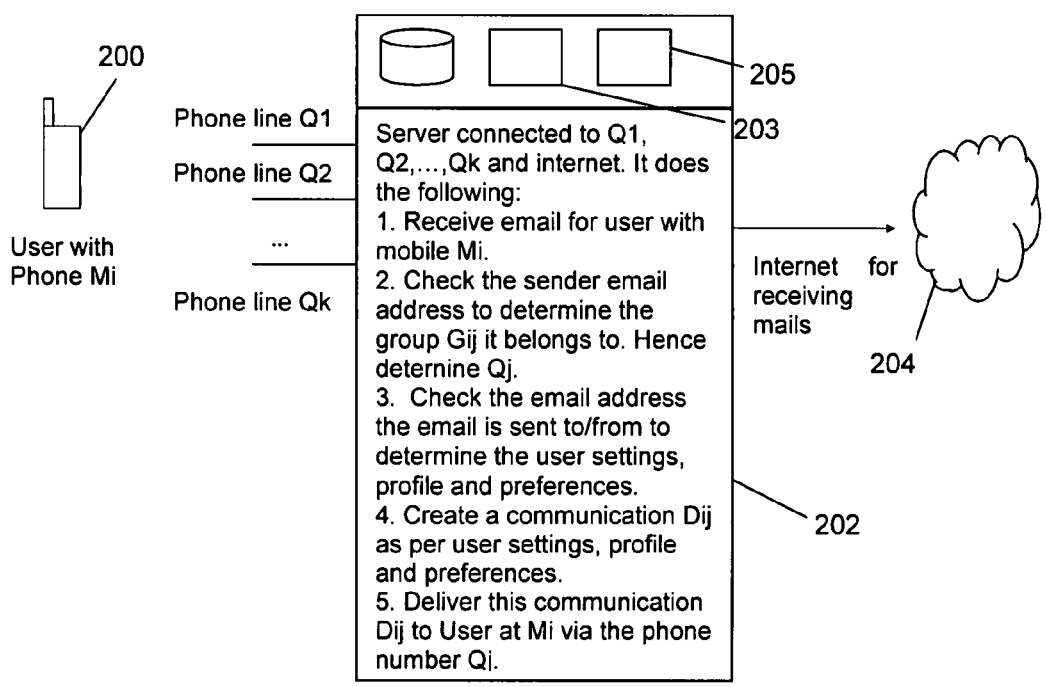
FIG. 2 is a schematic drawing illustrating an embodiment of the invention for receiving Emails at a mobile phone.

With reference to FIG. 2, the following describes an example embodiment of the present invention for receiving emails from a server 202 (directly sent to the server 202 or retrieved via POP3 or other access techniques or forwarded to the server 202), in which the emails are intended for the user identified by a phone number.

Similar to the system setup in FIG. 1, the system setup of FIG. 2 comprises at least one mobile phone 200 (M1, M2, . . . , Ma) and the server 202 that is connected to the Internet 204. The server 202 contains a database 202, wireless and wired data transceiver 203, and a processor unit 205. The server 102 provides services to the users via data/voice line connection(s) corresponding to 'k' phone number(s) Q1, Q2, ..., Qk, where each phone number corresponds to one complete service description. It is to note that 'k' phone number(s) Q1, Q2, ..., Qk are used for service of receiving emails as phone communication. There are 'a' number of users that are identified with their mobile phones M1, M2, ..., Ma. The email receiving service of the present invention is provided by the service provider on the server 202 side via 'k' phone numbers Q1, Q2, ..., Qk and a phone number Q0 for default groups.

For the users to use the service on mobile phone 200 Mi the user registers a group of one or more email addresses for each of the phone numbers Q1, Q2, ..., Qk. Let the group of email addresses that Mi registers for Qj be denoted by Gij. If a user wishes to use fewer than 'k' phone numbers for the service, then they can register for as many phone numbers as they wish. The process of registration is a one-time task and can be done via a web-site, email, SMS, faxing, or calling the service provider. The user with mobile phone 100 Mi may also change the email addresses in each of the groups Gij with a similar process as one used for the registration of groups. In the example embodiment, the numbers Q1, Q2, ..., Qk are set to be local phone numbers for the users M1, M2, ..., Ma.

Figure 4:
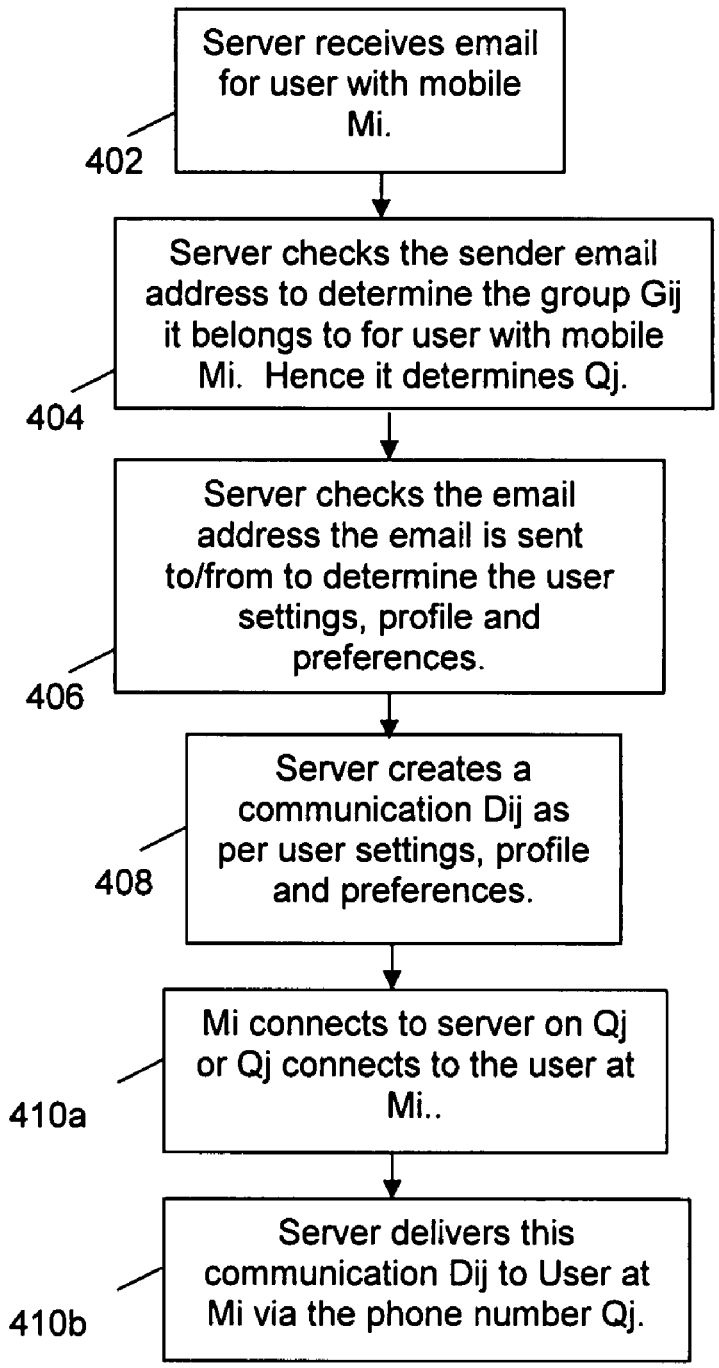
FIG. 4 is a flowchart of events for receiving Emails at a mobile phone in an embodiment of the invention.

With reference to FIG. 4, users use the service in the following manner.

At step 402, the server 202 (FIG. 2) receives an email for the user Mi (directly sent to the system or retrieved via POP3 or other access techniques or forwarded to the system). The recipient email address uniquely identifies the user Mi.

The sender email address is then checked to determine the group Gij where the sender email address belongs in step 404 for the user Mi. If it does not belong to any group, then it will belong to a default group G0.

After checking the group, which the sender email address belongs for Mi, the recipient (i.e. the user of the mobile phone 200, FIG. 2) of the email is checked in step 406 to determine the user settings, profile and preferences of the type of communication (e.g. SMS/MMS/voice call) that the user chose to receive the sender's email. For example, a user may choose to receive all text based incoming emails through voice recording only instead of SMS.

Let a received email to the user Mi from the sender in a group Gij be denoted as Tij. Next, the system converts Tij to a communication Dij based on the user preferences, profile and settings in step 408.

Following the conversion of Tij to a communication Dij, Dij is sent to the user Mi via the phone number Qj in step 410b. Alternatively, it may generate a notification to the user Mi inviting him to extract the communication Dij via the phone number Qj (step 410a).

Conversion of Tij to Dij may require extracting the attachment file and converting it to an audio signal, converting text to speech, or converting text in the email to an appropriate SMS and so on. Communication for default groups for all the users occurs via Q0.

Utilizing the steps above, besides mobile phones, the present invention, in various embodiments, is capable of facilitating receiving of emails from other communication devices such as fixed line phones and fax machines.

The following shows several examples of usage scenarios of the example embodiment as described for receiving emails.

In one example, the user may have a fax machine Mi. Any email sent for the user is converted to fax and sent as such from the phone number Qj when it is sent from one of the email addresses in Gij. Thus an ordinary fax machine can be used to receive an email from a sender's email address as it is used to receive a fax. In this scenario, the server 102 receives an email from a mail server, the email is then converted to fax and sent to the fax machine via phone number Qj.

In a second example, the user may have a fixed line/mobile phone 100 as Mi. Any email sent for the user from one of the email addresses in Gij is converted to a voice recording. Either the system can call Mi from Qj and play the voice recording or the user may call the system at Qj to listen to the voice recording depending on the user profile and preferences. In case the user calls Qj, the caller-ID is used to determine Mi and hence the voice recording for the email. In either case, the system and the user may interact further to manage the communication. Thus a fixed line/mobile phone can be used to receive an email sent from a designated email address as a voice message by simply calling a phone number Qj or receiving a call from it. In this scenario, the server 102 receives an email from a mail server, the email is then converted to a voice recording and its contents can be heard when the user calls phone number Qj.

In a third example, users may have a mobile phone as Mi. Any email sent for the user from one of the email addresses in Gij is converted to one or more SMSs. The system sends these SMSs to Mi from Qj. The conversion of the email to the SMSs (one or more) is done as per user settings, profile and preferences. Thus a mobile phone 100 can be used to receive an email as SMS (one or more) from a phone number Qj. In this scenario, for example, the server 102 receives an email from a mail server, the email is then converted to an SMS message and its contents can be read via phone number Qj.

In a fourth example, users may have a mobile phone as Mi. Any email sent for the user from one of the email addresses in Gij is converted to a voice recording. The system sends an SMS notification to Mi from Qj about the email and its content. The user may now call the system at Qj to listen to the voice recording depending on the user profile and preferences. When the user calls Qj, the caller-ID is used to determine Mi and hence the voice recording for the email. Thus a mobile phone can be used to receive an email as a voice message by simply calling a phone number Qj with a notification sent appropriately. In this scenario, the server 102 receives an email from a mail server, the email is then stored as a voice recording and a notification of the arrival of the email is sent to the user via SMS, after which the user can hear the voice recording via phone number Qj.

If the user has a mobile phone 100 with a phone-book, the phone numbers Q1, Q2, ..., Qk can be stored in the phone-book and dialed as such. This completely eliminates the need to remember any of them.

It is noted that an example embodiment can be realized such that the numbers used for sending emails (P1, P2, ..., Pb) can be same as one or more of the numbers used for receiving emails (Q1, Q2, ..., Qk). For instance, an SMS sent to 90019001 from 96613446 is sent as email to trikaala@hotmail.com while an email received from trikaala@hotmail.com for the user with mobile 96613446 is sent to 96613446 as one or more SMSs from 90019001.

As an example, a user registers his mobile phone 96613446 for the present service and registers the email address trikaala@hotmail.com at 67780703. Next, the user stores the number 67780703 in his phone-book as "EM Hari". Whenever the system receives an email for the user from trikaala@hotmail.com, the system calls 96613446 from 67780703. On the user's mobile phone 100 with number 96613446, the user sees "EM Hari" as the phone rings. Right away it is known that the call is referring to an email received from "EM Hari". After which, the user may proceed to receive the email as a voice communication. At the end of hearing the voice communication, the user may reply to the call. The system can make a recording of the user reply. It then lookups the registration that 96613446 has made for 67780703 to determine the email address trikaala@hotmail.com to which the voice recording is to be sent in an email as an email attachment. The user may also call 67780703 to send emails to trikaala@hotmail.com or listen to emails received from that email address via an interactive menu.

As another example, a user registers his mobile phone 96613446 for the present service and registers the email address trikaala@hotmail.com at 967780703. The user then stores the number 967780703 in his phone-book as "EM Hari". Whenever the system receives an email for the user from trikaala@hotmail.com, the system sends it as SMS to 96613446 from 967780703. On the mobile phone 100 96613446, the user sees "EM Hari" as the SMS is received. Right away it is known that the SMS is referring to an email received from "EM Hari". After which, the user may proceed to read it. He can also reply to the SMS by sending an SMS to 967780703. After the system receives the SMS at 967780703, it will look up the registration that 96613446 has made for 967780703, so as to determine the destination email address trikaala@hotmail.com to which the reply SMS at 967780703 is to be sent to as an email.

When the example embodiments described with reference to FIG. 1 and FIG. 2 are viewed as a whole, there is a complete system that comprises capabilities of sending and receiving emails.

Considering in combination the example embodiments as described by FIG. 1 and FIG. 2, as emails are sent out by the user with a mobile phone Mi to email addresses in Eij utilizing the communications Dij associated with phone number Pj, the email address for the user in the 'From' field can be customized as per user settings, profile and preferences. For example, assume that the system sends out emails from its server at www.chatteport.com. An email sent by user Mi to an email address E can have the email address A B@chatteport.com or A@B.chatteport.com in the 'From' field, where A identifies user Mi and B identifies the way the user Mi wishes the system to manage the reply sent in response to the email sent to E. Alternatively, an email sent by user with mobile phone Mi to an email address E can have the email address Mi Pj.Qj@chatteport.com in the "From" field. Thus indicating that the reply is to be sent as an SMS to Mi from the phone number Qj for an email sent via phone number Pj. The user may further set the system to forward a copy of the email to the email address of the user with mobile phone 100 Mi.

Next, another example embodiment of the present invention showing communication between two or more persons, in which some people use email to communicate and the other people use SMS will be described. This refers to two-way communication whereby the recipient of a communication can reply.

For example, there is a person using his email system (e.g. on-line, Outlook, Notes etc) to send/receive emails while another person uses a mobile phone to send/receive SMS. The communication may be initiated by either of the two parties. It is to note that ease of communication is an important factor. Hence the person using the SMS should be able to use the 'reply' function to reply to the SMS and the person using the email should be able to use the 'reply' function to reply to the email intuitively.

Firstly, it is assumed that there exist 'n' email addresses, which are e1, e2, . . . , en while there are 'a' mobile phone numbers M1, M2, . . . , Ma. The person with the mobile phone number M1 has registered email address e11 against mobile number P1 (any SMS sent by M1 to P1 is forwarded as email to email address e11), e12 against mobile number P2, and so on. Here e11 is any one of e1, e2, . . . , en, e12 is any one of e1, e2, . . . , en but other than e11, and so on. In a similar manner, the person with mobile phone number M2 has registered email address e21 against mobile number P1, e22 against mobile number P2 and so on. The same goes for mobile phone numbers M3, M4, and so on.

In the above embodiment, the registration was done by the mobile user with the phone number Mi. He registered the email address eij with the mobile phone number Pj. In yet another embodiment, the person with the email address eij may register the phone number Mi with Pj and inform the user with the mobile phone number Mi to send him an SMS at Pj in order to communicate.

In either of the embodiments, the users have the pertinent information in order to communicate. The user with mobile phone number Mi knows which phone number Pj to send the SMS to in order for it to be sent as email to eij and the email users know that the address of the mail server (www.mail server.com) being used for the service.

The server configuration will be as follows. It is capable of receiving SMS from M1, M2, and so on at phone numbers P1, P2, and so on (e.g. GSM modems connected to the computer server with SIM cards for mobile numbers P1, P2 and so on can do the job). The server also maintains a database with the numbers M1, M2, and so on and the email addresses registered with P1, P2, and so on. Further fields such as authorization to use the service may also be provided. The server is also capable of sending/receiving emails (e.g. an email server will do the job) with the address xxx@mail server.com, www.mail server.com being the Uniform Resource Locator (URL) for the mail server.

The following two example embodiments will illustrate two-way communication whereby the recipient of a communication can reply.

For an SMS-to-Email with reply, the mobile user initiates the sending of email with mobile number Mi to an email address eij. The user will send an SMS to the phone number Pj (Pj is stored in the phone-book of Mi for email to eij). The server knows the list of email addresses registered for Mi. It looks up the email address registered by Mi at Pj to get eij and sends the SMS as email to eij. In that email it uses the email address Mi@mail server.com as the email address from which the email to eij is sent. The recipient of the email at eij now can reply to the email by simply pressing the 'reply' button and entering the reply message. When the reply email is sent, it is received at the mail server. The mail server extracts Mi from the said email and checks which phone number the user at Mi registered the email address where the email is coming from. This phone number is Pj. It then takes the subject and the text message in the email and sends it to Mi as SMS from Pj. The user at Mi can again press the 'reply' button for the SMS and send a reply SMS that is again delivered to the email address.

For Email-to-SMS with reply, the sending of email is initiated by the user sending email from one of the email addresses e1, e2, . . . , en, say ej. When sender composes the email, he uses the email address Mi@mail server.com as the destination email address for sending the email as SMS to the user with mobile phone number Mi. When the email is sent, it is received at the mail server. The mail server extracts Mi from the said email and checks which phone number the user at Mi registered the email address where the email is coming from (firstly, ej is compared to all of ei1, ei2, . . . , ein to determine a perfect match; ej must match uniquely with eij; associated with eij is Pj). This is the phone number Pj. It then takes the subject and the text message in the email and sends it to Mi as SMS from Pj. The user at Mi can press the 'reply' button for the SMS and send a reply SMS that is again delivered to Pj as SMS. The server checks to see which email address is registered by Mi at Pj to determine the email address eij. The SMS is sent to the email address eij with the email address in the "From" field of the said email as Mi@mail server.com. The recipient of the email at eij now can reply to the email by simply pressing the 'reply' button and entering the reply message.

It will become apparent to those skilled in the art that the example embodiments described above can be extended to other communication techniques, including to SMS-to-IM and IM-to-SMS, where IM refers to Instant Messaging (e.g. AOL Messenger, ICQ, MSN Messenger etc).

Besides providing emailing services as described above, the embodiments described above may comprise more services, and thus more features.

An example of such further features can be to provide call alert. In an example embodiment, the system works when the user stores his phone-book with the service provider. In this case, when the call alert SMS is to be composed, the system checks to see if the user has stored his phone-book with the service provider.

If 'yes' (i.e. the user has stored his phone-book with the service provider), the system accesses the phone-book and uses the caller_ID information to search the phone-book and determine the name for the caller. Now, the name of the caller is inserted in the call alert SMS and it could be "CCC (name of the caller as registered in the phone-book) of phone_number (include the caller's phone number as determined from the caller_ID) tried to call you when you were unreachable". When the user phone-book contains no entry for the caller_ID, the name is left out from the call alert SMS or the call alert SMS may state "phone_number (include the caller's phone number as determined from the caller_ID) tried to call you when you were unreachable. This number is not in your phone-book".

To make the system more effective, the user with mobile phone number Mi can register the phone number vj with the service provider such that a call alert SMS is always sent from a phone number Pj to the user's mobile phone Mi when the caller calls from vj. It is to note that the user with mobile phone number Mi registers different phone numbers of callers, v1, v2, and so on, against different phone numbers P1, P2, and so on. When the system wants to send a call alert for a caller from phone number vj to the user at Mi, it looks up to check whether Mi registered vj for any of P1, P2, and so on.

If the answer is that vj was not registered by Mi, then a call alert SMS is sent to Mi from a phone number say P_last, which is configured for 'call alert for unregistered callers'.

If the answer is that vj was registered by Mi at phone number Pj, a call alert is sent to Mi from Pj. The user Mi may store P1 in his phone-book as call-alert from caller 1 (name), P2 as call-alert from caller 2 (name), and so on. With this new method, as soon as a call alert SMS is received, the user Mi can tell right away who the caller was for the said call alert and does not have to wonder whose phone number is contained in the call alert SMS. The call alert SMS may also be tailor made for the situations when the call comes from a number registered or not-registered by the user. Call alert SMS sent to the user from different phone number may be made different.

Further, the system may include both the name of the caller in the call alert SMS and his phone number in the SMS sent from Pj. This way the user can tell right away who the caller was for the said call alert because the name of the caller is included in the call alert along with the phone number of the caller.

The communication devices used, e.g. mobile phones can also be programmed to take different actions for call alert for different callers. A call alert for a call missed when the wife called may lead to a flashing SMS and so on. Similarly, a call alert when there is a family/office emergency may lead to a different action and so on. In this instance, the mobile phone checks to determine where the phone number call alert is from and takes the action that the user has programmed on his mobile phone for an SMS from the said phone number.

The registration of phone numbers P1, P2, and so on against the caller numbers v1, v2, and so on for the call alert may be done by the user on-line, or by sending SMS or calling or filling out the form. Also the service provider may begin to use different phone numbers to send call alert SMS from and then indicate the user through an information campaign, which comprises the benefits of the new scheme. A small note may also be inserted in the call alert SMS itself pointing to this new system and method. The user may also be informed of the call statistics (most frequently called numbers, most frequent numbers that call him, emergency numbers and so on) in order to assist in the decision process of registration. Another point is that if the phone-book is stored by the user on-line, the voice mail service may be checked to see if the caller phone number is registered by the user.

If the user registers it, the caller name can be inserted in the SMS sent to inform the user of the arrival of a voice mail from CCC (name of the caller registered by the user).

At this juncture, it is noted that the user may register phone numbers for voice mail retrieval (to be described later) and call alerts so that SMS for the voice mail and call alerts are sent from different numbers for different callers. However, the SMS alerts for voice mail left by a particular caller and a call alert for the same caller may be sent from the same phone number and the user may save that particular phone number in his phone-book as 'CCC (name of caller) voice mail/call alert'. The content of the SMS may indicate as to whether the SMS is for a call alert or voice mail.

Having mentioned Call Alert, the following describes Voice Messaging service as another example features. In this case, the service S is to 'make a recording of the incoming voice message and make it available on the Internet to target phone numbers'. A user registers a list of phone numbers for his phone number Mi to get this service at the phone number P1. Similar registration is carried out for service provider's numbers P2, P3, and so on. When the user calls P1 from his phone number Mi, the system makes a recording of the voice message, saves it on-line, creates access information for the voice message (user_name, password etc) for each of the phone numbers registered by Mi at Pj, and sends SMS to each of them with the web address and access information. Messages for the same phone numbers from different users may be combined under the same access information. The recipients of the SMS can now go to the web-site and use the access information to retrieve the voice message. Another method for retrieval that may be combined with the web based access method is to send the SMS from a phone number Rj the recipient to call and listen to the message. All messages intended for a particular recipient may be stored at the same phone number or at different numbers depending on the caller-ID of the sender of the message. When the recipient calls Rj, the system uses caller-ID of the recipient to deliver the voice messages intended for the said recipient. More about the methods for voice message retrieval will described later. Also, in an example embodiment, the system may call and deliver the voice message.

In another embodiment, the user may register for a service S 'make a recording of the incoming voice message and arrange for its retrieval by the phone; and send an incoming SMS to target phone numbers'. In this case, the user registers a set of phone numbers S11 for his phone number Mi to get the service for voice message at P1 and another set of phone numbers S12 for his phone number Mi to get the service for SMS at the phone number P1. Similar registrations are made for P2, P3, and so on. When the user calls P1 from his phone number Mi, the system makes a recording of the voice message and arranges for its retrieval by the phone numbers in S11. Similarly, when the user sends an SMS to P1, the system sends it as SMS to the phone numbers in S12. In this example embodiment, S11 and S12 are the same.

It will be clear to those skilled in the art that the method described above with reference to voice messaging and retrieval on the Internet is also applicable to e.g. sending faxes with retrieval on the Internet.

The next service described is Anonymous calling. Here the service S can be described as 'anonymous calling to target phone numbers'. The user first registers one or more phone numbers for this service at phone numbers P1, P2, and so on. When he calls Pj, the service provider dials out the phone numbers registered by the user at Pj and completes the voice call. For conference calling, the system may also allow the user option to select from the list of registered phone numbers and add more phone numbers.

Similarly, for Anonymous SMS, the service S would be 'anonymous SMS to target phone numbers'. The user at Mi first registers one or more phone numbers for this service at phone numbers P1, P2, and so on. When he sends an SMS at Pj, the service provider forwards it to the phone numbers registered by the user at Pj.

The system can also provide a means for reply back to the user. When any of the targeted persons reply, say from the mobile phone number Qj, it is received at Pj. The system then checks to see which user registered for the sending of anonymous SMS to Qj at Pj. The SMS is then forwarded to that user. The reply feature is an example embodiment that works as long as the same person Qj is not registered by more than one user at Pj. This method for reply back also works for anonymous voice calling.

Next, calling card service is described. In an example embodiment, firstly, a user has to dial out long sequences to access the calling card service. This is started by the user dialing the phone number, followed by keying in the pin and then followed by keying in the phone number of the intended recipient of the call. The following now comprise the service S at Pj. The user registers the exact sequence of digits to be dialed. When the user dials Pj using his phone number Mi, the service provider dials out the sequence registered by Mi at Pj. The user at Mi may register enough digits with the service provider such that the service provider simply connects the call for the intended recipient.

In another example embodiment of the present invention, it can feature incoming urgent/emergency calls. Sometimes people ignore a call or turn their mobile phones on silent mode so as not to be disturbed say when they are in a meeting. In such a case, they may miss an urgent call from a family member or a business associate. To avoid such a situation, and to absolutely receive the call, the user with mobile phone number Mi subscribes to the service S 'complete the call at all costs for callers with code Xj' at phone number Pj. Xj is a sequence of numeric digits of sufficiently large length and uniquely identifies Mi at Pj. User with mobile phone number Mi distributes Pj and Xj to only those persons he wishes to take calls from in emergency situations. Call from any caller who calls Pj and enters Xj is always forwarded to Mi from a phone number Bj (Bj and Pj are paired. Bj could be same as Pj). The user with mobile number Mi may also register other phone numbers/email addresses he may be available at. In such a case the service provider makes an attempt to reach the user at Mi but also at other phone numbers (by calling, sending SMS, emailing, instant messaging etc). The user with mobile number Mi can also store Bj in his phone-book as say 'emergency calls from ABCj' where ABCj is the person(s) who have been given Pj and Xj by the user at Mi. The mobile phone may also be programmed in a way so as to respond differently (say at the loudest volume in a peculiar ring-tone) to different Bj. Callers are not expected to call Mi via this service regularly. They are expected to use it in case they absolutely have to reach the user with mobile phone number Mi under some urgent/emergency situation.

Alternatively, there can be another approach to the example embodiment of handling incoming urgent/emergency calls. In this approach, the user with mobile phone number Mi registers a phone number for the service S 'complete the call at all costs to the user for caller registered by said user' at phone number Pj. Different phone numbers are registered by the user at Mi for P1, P2, and so on. The system ensures that a phone number registered by user with phone number Mi at Pj is not registered by any other user at phone number Pj. If any other user wishes to have this service for a phone number registered by Mi at Pj, he is provided this service via a phone number different than Pj. The user with mobile number Mi now distributes Pj to the person(s) whose phone number(s) was registered by him for the service at Pj. Whenever the said person calls Pj, the system performs caller-ID to determine which user registered them at Pj and then forwards the call to that user from a phone number Bj (Bj and Pj are paired. Bj could be same as Pj). In addition, an SMS notification of the emergency may also be sent to Mi from Bj. The user with mobile number Mi may also register other phone numbers/email addresses he may be available at. In such a case the service provider will make an attempt to reach the user at Mi but also at other phone numbers (by calling, sending SMS), emailing, instant messaging etc. In a similar manner, the user with mobile phone number Mi may register more than one phone numbers at phone number Pj for this service and use several numbers P1, P2, . . . to register different persons for different P1, P2, and so on.

The methods described above may also be combined. So if someone calls from a phone registered by the user with mobile number Mi at Pj, they need to do nothing more, however if they are calling from some other phone number, then they are required to enter the code Xj before the service provider takes the actions as stipulated.

In another embodiment, the person may send SMS to Pj which is then delivered to Mi (once again, the caller-ID of the incoming SMS is used to identify the user) from Bj. User Mi may program Bj as 'emergency message' in his phone-book.

Message retrieval/delivery will now be described in detail for example embodiments. Most current voice mail services are based on Interactive Voice Response Systems (IVRS) where the user has to spend valuable time to navigate through a voice driven menu. This is quite difficult and time consuming. It is thus desirable to have a system and a method for the user to be able to retrieve his messages in as short a time and in as convenient a way as possible.

Assume now there is a message (e.g. voice message, email retrieved by the system etc) for a user to be delivered at his mobile phone number Mi. The user may have programmed the system (programming can be done on a user mobile phone/fixed line phone or during anytime on the server) to inform him of certain voice mails and emails (e.g. from very important persons).

In this case, the system can let the user opt for delivery of messages of a special nature (voice mail from spouse, email from boss, stock alert/update, etc) from particular phone number pairs (P1 Q1), (P2 Q2), and so on. The user at Mi registers a set of email addresses and phone numbers for each of the pairs (P1 Q1), (P2 Q2) and so on. Hence when the system determines that the message intended for Mi has the special nature (from the caller-ID information of the caller or the email address of the email intended for the user, from the message itself etc), then it always sends a notification SMS from Pj to Mi. If the user is expected to call in (for voice mail or email read as speech after text-to-speech conversion) then the SMS notification includes Qj in it. The user may now call Qj to retrieve the voice message of the special nature. For certain messages of a particular special nature, the user may also program the system to call him from Qj and deliver the message. The user may store P1, P2 and so on in his phone-book under suitable headings such as 'Message from spouse/boss' and Q1, Q2, and so on under suitable headings such as 'Retrieve message from spouse/boss' (for instance). The system allows the user to retrieve all messages of a particular special nature at Q1, Q2, and so on. The user may also be allowed to register for additional functionalities for the messages of a particular special nature, for instance for a voice message by the boss, the user may program for the SMS to be sent from P1 to several of his mobile phone numbers along with an email (could be just an email notification or a complete email) to his email address and so on.

Messages of different nature will now be processed at different phone numbers (P1 Q1), (P2, Q2), and so on of the system as programmed by the user Mi in the example embodiment. All other messages that are determined to be not associated with any special nature can be lumped together and serviced at one set of phone numbers. The user may store these numbers in his phone-book under 'Generic messages' and 'Retrieve generic messages' (for instance).

Hence the user is able to automatically identify who sent the message before actually calling and retrieving the message and are able to retrieve the message directly in one click. Further, since the phone numbers do not change, the user may call them on his initiative to check for messages in cases such as a lost SMS notification.

In another embodiment, Pj and Qj may be same numbers. When the user receives an SMS notification from Pj, he may call back Pj to retrieve his message.

There are also Information Notification Services. This can be described in the context of a notification for music (an instance of information) that is played by a radio station. One difficulty is that the listeners can never know which song the radio station will play anytime. One way to solve this problem is for the radio station to let a listener register his mobile phone for the songs of their choice (S1, S2, . . . ) against different phone numbers (P1, P2, . . . ). The radio station can set up a web-site for subscribers to accomplish this. Different users will have different choices. When a song of choice of user with mobile number Mi, say Sj, is about to be played, the radio station will send SMS notification from Pj to Mi. The user can program his phone-book to indicate 'song S1' for phone number P1 and so on. Upon notification, the user has the choice to either ignore the song or tune to the radio station and listen to the song. The notification can include a phone number P in the notification for the user to call in and listen to the music. The number P may be fixed by the radio station for broadcasting its music so that the user may also store it under 'Radio station FM.'. The same system is also applicable when users register with a service provider to provide for notification for stock alerts and so on.

Moreover, the example embodiments of the present invention can be extended to provide a Single Number Voice Messages Up and Down service.

The features of this service comprise a phone number Pairs (P1 Q1), (P2 Q2) and so on of service provider, a sender phone number Mi, and a recipient number Ri. An example of the user experience of sender Mi is as follows.

Firstly, both users with phone numbers Mi and Ri register with the service provider so that every voice message sent/received to/from Mi and Rj is done via one such pair (P Q).

The next step relates to the sending of voice message from sender phone number Mi. Sender calls P from his phone number Mi (from the phone-book or through some other means) and leaves a voice message. The service provider records the voice message and the incoming phone number Mi (using caller-ID). Also, knowing that Mi has registered with Ri for the service at (P Q), the system now knows that the message is meant for Ri. It is then sent to Ri as per service agreements during registration and so on.

The next step relates to the receiving of voice messages on sender phone number Mi. Now, the system has a message for Mi, which is sent by Ri. Depending on the system preferences set by Mi, the system either calls Mi from the phone number Q and plays the message or sends an SMS from phone number Q inviting Mi to call Q to listen to the voice message. Alternatively, Mi can Q anytime to retrieve any messages sent by Ri.

In this case, all voice message communications between Mi and Ri occur with the phone number pair (P Q). Thus for convenience, P can be stored in the phone-book of Mi for "voice message to Ri" and Q as "voice message from Ri". All messages sent by Mi for Ri and vice versa are accessible via (P Q). Further features may be built in such as a message left by Mi for Ri at P is also sent as email to pre-registered email address(es).

The phone number Pj for sending voice message and Qj for retrieving voice message can be the same number also in an embodiment whereby the user at Mi calls Pj to send a message and Pj calls Mi to deliver a message. Other combinations are possible whereby if there are any voice messages at Pj for the user at Mi, they are read to him first when he calls and then he is asked to deposit his voice message.

Based on the above description for a Single Number Voice Messages Up and Down service, it will be appreciated that the same number P can also be use for all SMS communications. Further, it can be extended to more than two persons to create a 'buddy group' ('buddy SMS' and/or 'buddy voice message' system) where any message (voice or SMS) left/sent by one is delivered to all the buddies registered at P. Caller-ID of the person sending/leaving the message is used to identify the 'buddy group' Different buddy groups can be registered at different numbers P1, P2, and so on.

Example embodiments may also be extended to provide Reminder Services. In many cases, one registers with a reminder service where they register certain SMS to be pushed to their mobile phone at a pre-selected time (meetings', appointments' reminders etc). These SMSs are sent from a single number by the service provider. Thus the recipient has no way of knowing as to the nature of reminder till he opens up the reminder SMS and reads its contents. Now with this reminder service, the user can choose to get reminders from one of the many numbers P1, P2, and so on. The number that the user selects to receive reminder from depends on the nature of reminder and other user preferences. These phone numbers that the reminders are sent from can be stored by the user in his phone-book. As the reminder is received, the user knows what the reminder is about from the phone number it is sent from and the corresponding phone-book entry. The user may also program the system to do different things for the reminders originating from different numbers, such as a reminder coming from P (say for some meeting with boss) is sent to several mobile phone numbers while some others (e.g. not so important ones) are sent only to one mobile number.

Another feature of an example embodiment of the present invention is, for example, the use of audio (voice, celebrity voice etc) for reminders. The system sends SMS and/or places a voice call from one of P1, P2, . . . , to the person the reminder is intended for. The system may also send an SMS from a phone number that the user may call and listen to the voice reminder. Thus far all reminders have been SMS based.

It is possible to combine services such that at the same service provider's phone number P, the service that the user with mobile phone number Mi gets is different from the service that user with mobile phone number Mf gets. This is possible as the service is caller-ID dependent. The service that the user with mobile phone number Mi gets at P could in turn be a combination of services described under individual headlines here. For instance, user with mobile phone number 96613446 calls 61234567 the service can be 'number 1 song on US chart' while when 96417415 calls 61234567, the service can be 'send a voice mail as email to trikaala@hotmail.com and deposit it in the voice mail account of 96247977'.

In the following, as another example embodiment, an information retrieval service called "Music Information Services" will be described.

The example embodiment described is applicable to other types of audio information as well. Mobile phones (including GPRS phones) suffer from two major problems, memory and processing capability. Some advanced models of phones have reasonably large memories (memory stick etc) and processing capability that may allow a person to transfer the music from the PC to the phone and play it. Even then the memory on the phone may be limited and it may not be possible to store the entire selection of the music that a listener desires to store on the mobile phone.

This example embodiments let the user select his music and be able to listen to it in as easy a manner as possible. In the framework of the example embodiments described so far, the user gets a service S 'listen to the desired music' at a phone numbers P1, P2 and so on. Hence the user just calls Pj and listens to the music of his choice. Pj is programmed for the music of user's choice. Different users calling the same number Pj will listen to the music of their choice.

The example embodiment provides some solutions to accomplish the task of making the music of choice available at the number Pj. For instance the Music Service Provider (MSP) could offer the number one song on a particular chart at P1, number two song at P2, and so on. Depending on the marketing approach and mix of music, MSP may also offer several top songs on P1 and so on. Different users calling P1 at different times will get to listen to the top music on a particular chart from the very beginning. As users register/subscribe for this service, they will be able to select the particular chart that they want. As the caller calls in, the MSP will perform caller-ID to determine the particular chart that the user has subscribed for and would then play the corresponding music in the chart. The user is also able to store the phone numbers and the music they play in his phone-book. Now the music of choice (top songs on a chart of choice) is easily available to the user.

Another example is to create a database DB with the MSP that the user can upload his music to. Each of the subscribers is assigned his own storage space S in the database DB and an account with the database server that can be used by the subscriber to upload his music from his Personal Computer (PC) (or some web-site on the internet, sharing from other sources) to his storage space using the internet. This said account with the database server is linked uniquely to the phone number of the subscriber. The DB is now accessible by a computer system/server termed the Music Server (MS). The MS can access the music file/folder in any storage space, input it to one of the many players that convert the contents of the said file/folder to music in audio form and make it available to any one who calls a given phone number P. The user now calls P, the MS performs caller-ID to determine the identity of the user and hence the music that he wishes to listen to (this is the same music that the user has uploaded into his storage space S). The MS then accesses the file/folder that was uploaded by the said user, converts it to music in audio form and plays it for the caller on the phone. The MSP may also provide a software program that the user may run on his PC to upload and manage files/folders in his storage space S. This program may also compress the information before uploading it to his storage space in order to save the overall transmission time. The database DB may also store information in compressed form and decompress it as and when required. The compression/decompression used by the database DB may further depend on the fact that the music is accessed using the phone network.

The method described in the above paragraph is readily generalized to provide for several databases DB1, DB2, . . . , that the user can upload music to with each of the databases now accessible by calling a different phone number P1, P2, and so on respectively. All such databases can also be a part of a bigger database that can be accessed by calling P. At P, the user may be asked to navigate using Dual Tone Multi Frequency (DTMF) tones to select and play the music of his choice stored in DB1, DB2, and so on. The user calls P1, P2, and so on to reach directly to the music of his choice in DB1, DB2, and so on. MSP may also provide for the users to share their music with other users based on authorizations and so on.

Many service providers also provide for GPRS based access to data stored on the server. In this instance, the MS will provide for GPRS based access to the music stored in DB1, DB2, via a different URL for each and so on. A music player software/hardware needs to be provided for at the mobile phone (say a pocket PC etc) for the digital data stream to be converted to music in audio form.

Whether the music is downloaded using the GPRS etc or by simply calling, it may be recorded at the mobile device for playing in the future. The example embodiment is applicable for archival and its retrieval of content of a wider variety.

Figure 14:
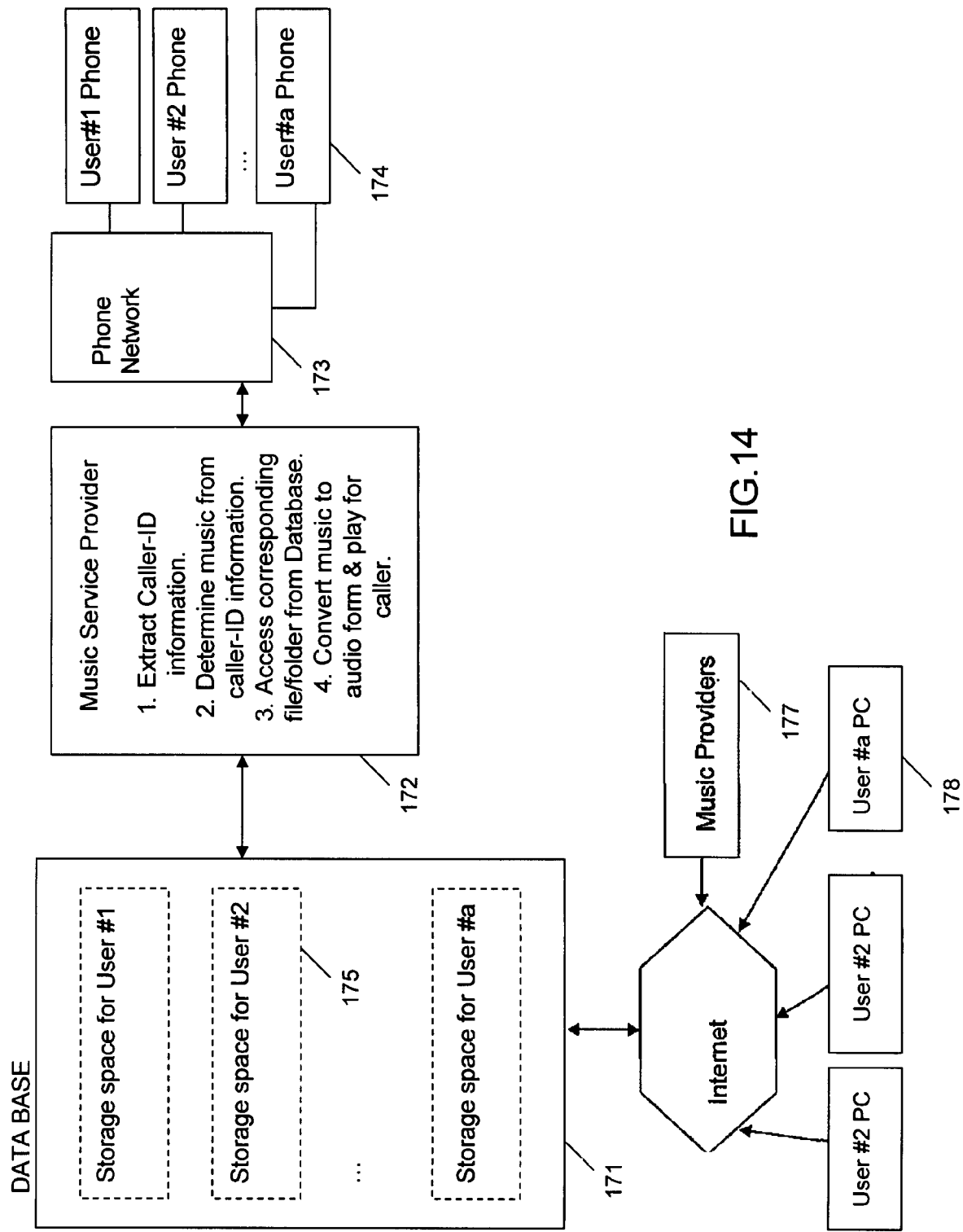
FIG. 14 is a schematic drawing illustrating a system in an example embodiment of the present invention.

With reference to FIG. 14, the system set-up of the example embodiment may comprise a database (DB) 171 with storage spaces for at least one user data 175 (e.g. the data of registered caller_ID information, pre-selected songs the user wishes to listen etc.), a Music Service Provider (MSP) 172 with a Music server controlling all features of the MSP 172, a Phone network 173 (e.g. PSTN) capable of connecting to at least one phone user 174, the Internet for connecting to the servers of other Music Providers 177 and connecting to at least online user 178.

Figure 15:
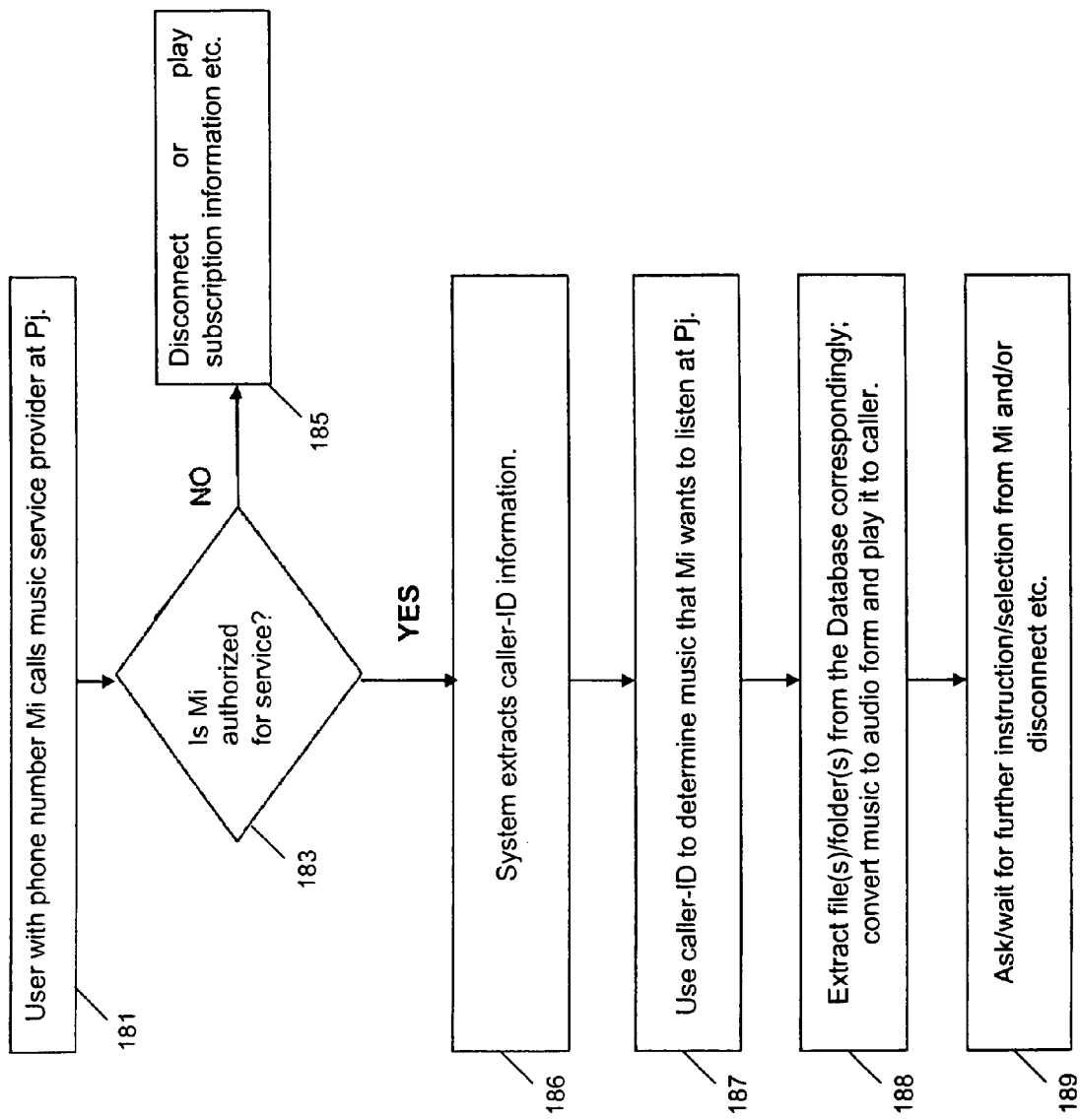
FIG. 15 is a flow chart illustrating a sequence of communication steps in the example embodiment of FIG. 14.

With reference to FIG. 15, the example embodiment above may be described by the following steps.

To begin with, at step 181, a phone user 174 (FIG. 14) with phone number Mi calls the MSP 172 (FIG. 14) at Pj.

Next, the MS of the MSP 172 (FIG. 14) checks pre-stored information 175 (FIG. 14) in the DB 171 (FIG. 14) to verify whether Mi is authorized for service in step 183.

If Mi is authorized for the service, the MS extracts caller-ID information belonging to the user phone 174 (FIG. 14) in step 186.

If Mi is not authorized for the service, in step 185, the MS disconnects the user or play subscription information such as prompting the user to register.

After the caller-ID information is extracted, the caller-ID is utilized to determine music that Mi wants to listen at Pj in step 187.

Next, at step 188, the music file(s)/folder(s) associated with the music that the user wishes to listen is extracted from the DB 175 (FIG. 14) by the MS. If required, the MS converts files to audio form and played the music to the caller.

Finally, at step 189, the MS either asks the user or waits for user further instruction/selection from Mi and/or disconnect.

An example of the database for use in an example embodiment of the present invention will be described in detail as follows.

Figure 5:
FIG. 5 is a table illustrating the logical arrangement of a database of Complete Service Descriptions (CSD) of services for users of an example embodiment of the present invention.

Consider a service S to be provided to users with electronic addresses M1, M2, ..., Ma. It requires features for a complete description. The complete service description is "S with features SF1, SF2, ..., SFc. For each of the users that wish to use the service S, all the possible complete service descriptions are determined based on the feature values of interest to the users. In the database illustrated as table 500 in FIG. 5, for the user with electronic address M1, let the complete service descriptions be CSD(1,1), CSD(2,1), ..., CSD(b,1). Here CSD denotes 'complete service description'. CSD is followed by (j,1) where j denotes the j-th CSD, and 1 denotes the first electronic address. For the i-th user with electronic address Mi, let the complete service descriptions be CSD(1,i), CSD(2,i), ..., CSD(b,i). There is a total of a×b CSD; there are b CSD for each of the 'a' electronic addresses. These CSD in the database can be arranged in a table form as shown in FIG. 5. Examples of the electronic address can be a phone number (mobile or fixed), email address, instant messaging address and so on. Moreover, the CSD for the electronic addresses belonging to each user may be determined without taking into consideration the CSD of any other user.

This example embodiment the database consists of assigning an electronic address P1 to provide the first CSD (more precisely CSD(1,1), CSD(1,2), CSD(1,3), ..., CSD(1, a)) to all users. Similarly it assigns an electronic address P2 to provide the second CSD (more precisely CSD(2,1), CSD(2, 2), CSD(2,3), ..., CSD(2, a)) to all users. In general, Pj is assigned to provide the j-th CSD (more precisely CSD (j,1), CSD(j,2), CSD(j,3), ..., CSD (j,a)) to all users.

Any user with electronic address say Mi will be registered for the service (either by himself or by someone else depending on the service) in a way that its first CSD (CSD(1,i) to be precise) is registered with P1, its second CSD (CSD(2,i) to be precise) is registered with P2, and so on.

The i-th user with electronic address Mi is registered with the service provider to be provided with service S having the j-th complete service description (CSD(1,i) to be precise) via the electronic address Pj of the service provider. The service provider may offer its electronic addresses P1, P2, ..., Pb and the user registration may be performed by the users, service provider, or a third party. These registrations can be altered by/for the users as per agreements, user preferences, settings etc. Registration for the service is expected to take place less frequently than the usage of the service in most methods. This registration information is stored with the service provider in the database that resides with the service provider. Other types of information may also be stored including authorization for the use of service, payment information, service specific information and so on.

The user can store the electronic addresses P1, P2, ..., Pb in a suitable way that could be in a phone-book of a phone if these electronic addresses are phone numbers or an address book of a email system if these electronic addresses are email addresses and so on.

Depending on the service, there are two scenarios, either the user or the service provider initiates a contact with the other. The contact is established between Mi and Pj. Once this is done, a communication Dij is sent from one to the other (either one of the user or the service provider can be the source or destination). We note that the key to providing a simple user-experience is to ensure that the communication is as simple as possible (just call and talk, just send SMS, just send email). The communication is not used to extract any feature information about the complete service description.

In the first scenario, if the user initiates the contact, he determines which CSD he wishes to get, determines Pj accordingly and then contacts the service provider at Pj using Mi. When the user at Mi contacts the service provider at Pj, the service provider determines Mi (using caller-ID for phones, email address for emails, instant messaging ID for instant messaging etc). Knowing Mi and Pj, the service provider performs a data-base look-up to determine the CSD(j,i) and provides it to the communication Dij. Once the data-base is set up with the service provider, the user just has to contact the service provider at a suitable Pj depending on the CSD which is then provided to the communication Dij. The content of the communication are not processed to determine which complete service description is to be provided as that would require the user to remember to format the content of the communication for that complete service description. The complete service description is determined only from Mi and Pj.

Figure 10:
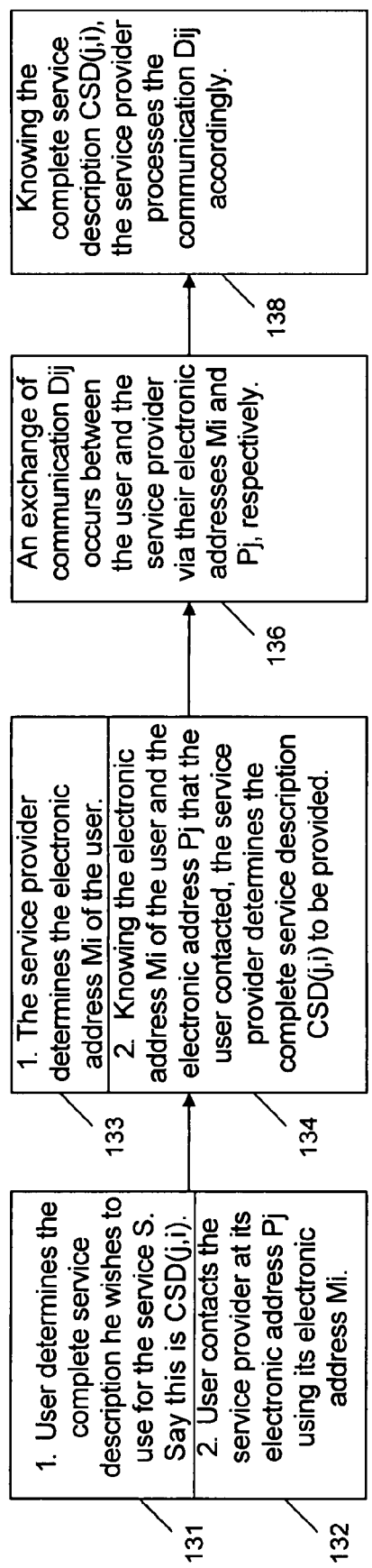
FIG. 10 is a flow chart illustrating a communication sequence in an example embodiment of the present invention.

With reference to FIG. 10, in step 131 the user determines the CSD he wishes to use for the service S. Let this be CSD(j,i).

In Step 132, the user contacts the service provider at its electronic address Pj using its electronic address Mi.

The service provider then determines the electronic address Mi of the user at step 133 via caller-ID or by noting the email address the email is sent from and so on.

Knowing the electronic address Mi of the user and the electronic address Pj that the user contacted, the service provider determines the complete service description CSD(j,i) to be provided at step 134. The service provider does this by doing a database look-up as shown in FIG. 6, wherein row 62 and column 66 intersect to determine block 64, which contains CSD(j,i).

Following that, in step 136, an exchange of communication Dij occurs between the user and the service provider via their electronic addresses Mi and Pj respectively.

Knowing the complete service description CSD(j,i), the service provider processes the communication Dij accordingly at step 138.

In the above example, it is assumed that the communication could be from either the user to the service provider or vice versa.

In the second scenario, if the service provider is to initiate the contact, it first determines which CSD it wishes to provide. If it is CSD(j,i), then the data-base look up is used to determine the user Mi to be contacted and the electronic address Pj to be used for the contact. Accordingly the service provider contacts Mi using Pj and provides CSD(j,i) to the communication Dij. The content of the communication are not processed to determine which complete service description is to be provided as that would require the content of the communication in a certain format for that complete service description. The complete service description is determined only from the features such as the electronic addresses (phone numbers, email/IM addresses) the communication is sent to/received from and so on. The complete service description is determined only from Mi and Pj.

Figure 11:
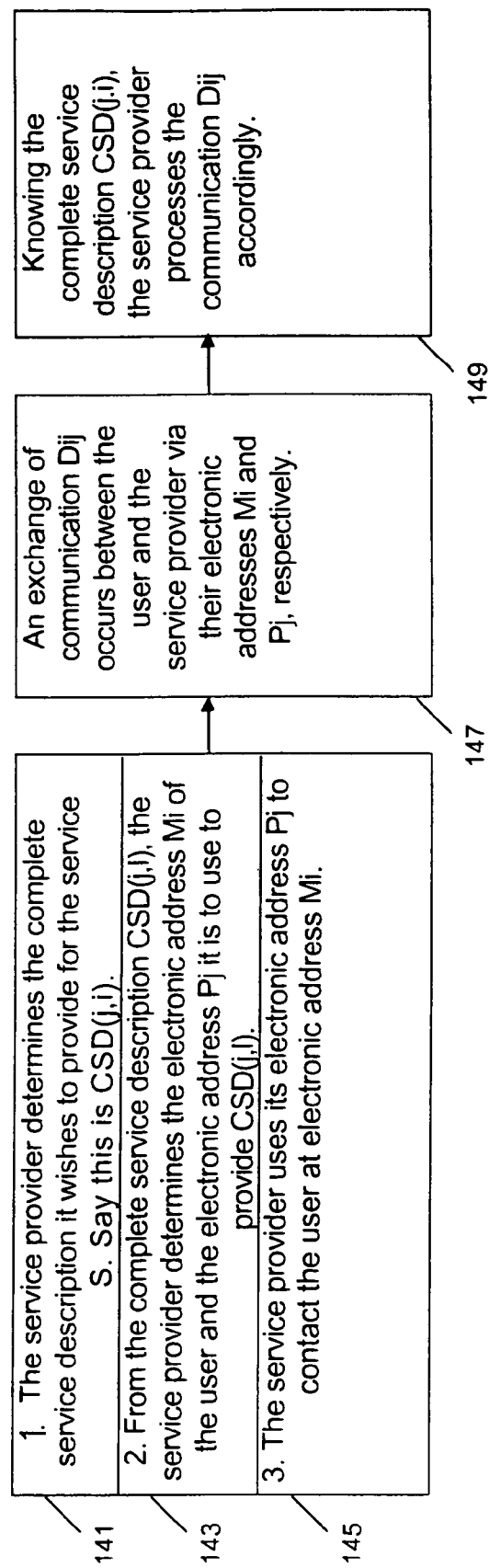
FIG. 11 is a flow chart illustrating a communication sequence in an example embodiment of the present invention.

With reference to FIG. 11, in step 141 the user determines the CSD he wishes to use for the service S. Let this be CSD(j,i).

In Step 143, from the complete service description CSD(j, i), the service provider determines, by looking up the database, the electronic address Mi of the user and the electronic address Pj, where both Mi and Pj are to be used to provide CSD(j,i). In FIG. 7, the logical representation of the database lookup is shown as row 72 and column 76 intersecting at block 74 to give CSD(j,i).

After that, the service provider uses its electronic address Pj to contact the user at electronic address Mi at step 145.

Following that, in step 147, an exchange of communication Dij occurs between the user and the service provider via their electronic addresses Mi and Pj respectively.

Knowing the complete service description CSD(j,i), the service provider processes the communication Dij accordingly at step 149.

In the above example, it is assumed that the communication could be from either the user to the service provider or vice versa. Further, as the cost of communication in the example embodiments of the present invention may be a factor, in situations when service provider's electronic addresses are phone numbers, the service provider's phone numbers are made local or toll-free to the user as a preferred embodiment.

The following example embodiments of the present invention use Caller/Mobile Station Identifications (ID) and services e.g. SMS and email, to illustrate the two scenarios above.

EXAMPLE 1

Enabling SMS to Email Communication.

Consider two users with mobile phone numbers M1=96613446 and M2=90214091. The service S is 'send the SMS received from the user as email'. This requires one feature 'email address of the recipient'. Say user of 96613446 wants the service for email addresses a@b.com and c@d.com while 90214091 wants it for e@f.com and g@h.com.

With Reference to FIG. 6, the CSD for 96613446 are:

CSD(1,1) "send an SMS received from user 96613446 as email to a@b.com."

CSD(2,1) "send an SMS received from user 96613446 as email to c@d.com."

Similarly the CSD for 90214091 are:

CSD(1,2) "send an SMS received from user 90214091 as email to e@f.com."

CSD(2,2) "send an SMS received from user 90214091 as email to g@h.com."

The service provider needs two electronic addresses (phone numbers capable of receiving SMS from a mobile phone). Let these be 9123 and 9124. The service provider provides these numbers and the users are required to register with the service provider for these CSD. An on-line account is created on the service provider's web-site that the users can log into to specify their registrations. Once registrations are done, the service provider's database looks like FIG. 8.

With reference to FIG. 8, once this registration is completed, the user with electronic address as mobile phone number 96613446 (block 81) can store 9123 (block 87) in his mobile phone-book as "EM A" to denote "email to a@b.com (block 83)" and 9124 (block 89) as "EM C" to denote "email to c@d.com (block 85)".

Similarly, the user with electronic address as mobile phone number 90214091 (block 82) can store 9123 (block 87) in his mobile phone-book as "EM E" to denote "email to e@f.com (block 84)". 9124 (block 89) as "EM G" to denote "email to q@h.com (block 86)".

After storing and naming the respective numbers, in order to send email to a recipient with email address of a@b.com, the user of mobile phone 96613446 starts by composing a text SMS, goes to the phone-book, selects the entry "EM A" (which corresponds to 9123) and presses the send button. Note that the user does not need to remember any format or insert any commands into the SMS.

When the SMS is received at 9123, through caller-ID information, the service provider identifies the registered sender mobile phone number as 96613446 (block 81) in the database. Knowing the sender mobile phone number, 96613446, and the number, 9123, the service provider performs a look-up of the database using 96613446 (block 81) and 9123 (block 87) to determine the CSD.

Once the CSD is determined as "send SMS received from 96613446 as email to a@b.com", the service provider creates an email with the SMS text as the content of the email and sends it to a@b.com.

Thus, it can be seen that once registration is done, sending an email is as easy as sending an SMS i.e. write the SMS, select the number from the phone-book, press 'send' and the email will be sent.

EXAMPLE 2

Enabling Email to SMS Communication

Consider the previous example, now with the users seeking for the service S of "the recipient of the emails should be able to reply to the email by simply pressing the 'reply' button on their email system and the reply should be pushed to the user as SMS so that the user knows right away who the sender is".

This is done by letting the service provider use a unique email address for each sender. Typically, the email address for the mobile number 96613446 may be of type 96613446@xyz.com (other configurations are possible). This email address is inserted in the 'from' field of each email sent out by the service provider. The service S requires two pieces of information that is the email address of the recipient and the email address of the sender.

For instance, the user of mobile phone with telephone number, 96613446, wants the above service for email addresses a@b.com and c@d.com while the user of mobile phone with telephone number, 90214091, wants the service for e@f.com and g@h.com.

With Reference to FIG. 9, the CSD for 96613446 are:

CSD(1,1) "For an email received at 96613446@xyz.com, sent by a@b.com, take the email text, convert it to SMS and send to 96613446".

CSD(2,1) "For an email received at 96613446@xyz.com, sent by c@d.com, take the email text, convert it to SMS and send to 96613446".

Similarly the CSD for 90214091 are:

CSD(1,2) "For an email received at 90214901@xyz.com, sent by e@f.com, take the email text, convert it to SMS and send to 90214091".

CSD(2,2) "For an email received at 90214091@xyz.com, sent by g@h.com, take the email text, convert it to SMS and send to 90214091".

The phone-book entries in the mobile phones of the users are same as the previous example. That is, "EM A" to denote block 93, "EM C" to denote block 95, "EM E" to denote block 94 and "EM G" to denote block 96. When an email is received, the service provider checks the email for the recipient's email address and the sender's email address. This check provides the service provider with the required features of the service.

Taking as an example a case of an email that is to be sent to 90214091@xyz.com and the email is from g@h.com.

In the database as illustrated in FIG. 9, the CSD of the case is determined to be "For an email received at 90214091@xyz.com, sent by g@h.com, take the email text, convert it to SMS and send to 90214091" (block 96).

After determining the CSD, the service provider takes the text of the email and converts it to an SMS.

The service provider then performs the database look-up to determine the user mobile number 90214091 (block 92) and the phone number 9124 (block 99), in which 9124 is the number the service provider will be using to send out the SMS.

Next, the service provider will push the SMS to the user at 90214091 using the number 9124. As the SMS is received at 90214091, the mobile phone with number 90214091 makes use of the functionality of caller-ID service to indicate to the user that the SMS is sent from "EM G". The user knows right away that the SMS corresponds to an email sent from g@h.com. If the user wishes, he can simply use the 'reply' function to send an SMS reply back to the service provider and the SMS will be reconstructed as an email to be sent to the email address g@h.com.

EXAMPLE 3

Enabling SMS to Email and Email to SMS Communication

It will be appreciated by those skilled in the art that the services in Examples 1 and 2 (SMS sent as email and email sent as SMS respectively) above can be provided for by the service provider using the same set of electronic addresses to further enhance the utility of the overall system and method.

In this case, the user with the mobile phone can send SMS to the service provider. This SMS is then constructed as an email to be sent utilizing a registered sender email address to a registered destination email address.

Conversely, when the targeted user wishes to reply to the sender's email, he may make use of his registered destination email address to send an email to the registered sender email address. This email is then constructed as an SMS to be sent from the registered destination email address to the user with the mobile phone.

This back and forth of SMS to email to SMS is accomplished with both parties (one sending SMS and other sending email) using a simple 'reply' feature for their communication.

It is clear to those skilled in the art that the electronic addresses and the service provider systems must be suited to handle the nature of communication they are being designed to handle. For instance, if the service in Example 1 relates to voice calling instead of SMS, then the service provider must be able to receive a voice call at the two service provider's phone numbers, make a voice recording of the caller's voice message, convert it to a file with suitable format, attach it to the email and send it out.

Since all communication occurs between the electronic addresses of the user and the service provider, it will be worthwhile to minimize the costs of such communications. Hence, for SMS and voice calls, it might be best if the service provider's phone numbers are local or toll-free to the user.

EXAMPLE 4

Enabling SMS/Voice Call to Email Communication

Consider an extension of the service described in Example 1. The service S is now "send the SMS or a voice message received from the user as email". Thus, the user can either send an SMS or call from his mobile phone.

Now, the CSD for 96613446 are:

CSD(1,1) "send an SMS/voice message received from user 96613446 as email to a@b.com"

CSD(2,1) "send an SMS/voice message received from user 96613446 as email to c@d.com"

Similarly the CSD for 90214091 are:

CSD(1,2) "send an SMS/voice message received from user 90214091 as email to e@f.com"

CSD(2,2) "send an SMS/voice message received from user 90214091 as email to q@h.com."

The rest of the system and the method and its workings are clear from the descriptions here and in Example 1. Hence the user can either call (same as voice call) or send an SMS (same as sending regular SMS) and send an email out to one or more email addresses.

EXAMPLE 5

Enabling Fax to Email Communication

At this stage, it should be obvious to those skilled in the art as to how to use a fax machine to send faxes as email attachments to one or more email addresses by simply making a regular fax call.

It has been stated that caller-ID can be used to identify the electronic address when it corresponds to a phone. In some situations, caller-ID may not work (in some places caller-ID does not work for voice calls for mobile phones when they roam). In that case, the service provider may assign account name and pin to the users in order for them to use to authenticate themselves to the service provider when they initiate the contact.

Collecting from the description made so far and describing further details, the following are numerous example embodiments of the service the present invention can provide.

I. Sending Text Emails/IM from Mobile Phone (SMS to Email, SMS to IM)

In this example embodiment, the electronic addresses of the user and the service provider are capable of sending and receiving SMS, respectively. The service has been described in Example 1 above. An SMS sent by the user from Mi to Pj is pushed to the email address(es)/IM address(es) registered at Pj for Mi in the appropriate form as email/IM. In case of IM, sending of SMS from Mi to Pj is also to allow for the IM service provider to sign in the user for IM if not done so already and deliver the SMS as IM if parameters of IM (the person at destination is on-line and so on) are met.

II. Sending Group SMS from Mobile Phone (SMS to Group SMS)

In this example embodiment, the electronic addresses of the user and the service provider are capable of sending and receiving SMS, respectively. The service is to push one SMS and have it delivered to one or more electronic addresses (that can receive SMS, example is mobile phones) as SMS. An SMS sent by the user from Mi to Pj is pushed to the mobile phone numbers registered at Pj for Mi as SMS.

III. Sending Text Emails/IM+SMS from Mobile Phone (SMS to Email, SMS to IM, SMS to Group SMS in one)

This is a combination of example embodiments in I and II above. One or more email/IM addresses and mobile phone numbers are registered at Pj. An SMS sent by the user from Mi to Pj is pushed to the email address(es)/IM address(es) and mobile phone numbers registered at Pj for Mi in the appropriate form as email/IM and SMS, respectively.

IV. Sending Text Emails/IM from Mobile Phone (SMS to Email, SMS to IM and Reply)

In this example embodiment, the electronic addresses of the user and the service provider are capable of sending and receiving SMS, respectively. The service has been described in Examples 2 and 3. Example 2 describes 'email to SMS' service and Example 3 describes 'SMS to email and reply' service. The description is sufficient for those skilled in the art to apply it to IM as well.

V. SMS Backup Service

In this service, the user wishes to save the short messages received from different mobile numbers through SMS in a way to distinguish who the sender is. For instance, the user with mobile phone number Mi wishes to clearly identify senders with mobile numbers Q1, Q2, . . . , Qb. An ID for Q1 at P1 say 'Raj', ID for Q2 at P2 say 'Ram', and so on are registered for user at Mi. In preferred embodiment, 'Raj' is the phone-book entry in the user's phone-book for P1, 'Ram' is the phone-book entry in the user's phone-book for P2, and so on. The user can save P1 in the phone-book as 'Raj BkUp', P2 as 'Ram BkUp', and so on. When the user wishes to backup an SMS he received from 'Raj', he forwards it to 'Raj BkUp'. When the SMS is received at P1, the service provider checks preferences/settings for mobile phone number Mi. The user may be signed for this SMS to be sent to his designated email address with a suitable subject such as 'SMS Backup from Raj' and from an email address such as 'Raj bkup@serviceprovider.com' to clearly identify the SMS and its original sender in user's email system. The user may also sign for this SMS to be saved in an on-line account under the heading 'SMS Back-up from Raj'. The same is true for SMS received from other users.

VI. Sending SMS/Voice Emails/IM from Mobile Phone (SMS/Call to Email/IM)

In this service, the electronic addresses of the user and the service provider are capable of sending and receiving SMS/voice calls, respectively. The service has been described in Example 4. An SMS/voice call sent by the user from Mi to Pj is pushed to the email address(es)/IM address(es) registered at Pj by Mi in the appropriate form as email/IM. Voice call is recorded and pushed as a file in an appropriate format. In case of IM, SMS/voice call from Mi to Pj is also to allow for the IM service provider to sign in the user for IM if not done so already and deliver the SMS/voice file as IM if parameters of IM (the person at destination is on-line and so on) are met.

From this description and the descriptions in W, the following services will become clear to those skilled in the art: (a) 'sending SMS/voice email/IM from mobile phone and reply', (b) 'sending voice emails/IM from fixed-line phone', (c) 'sending voice emails/IM and reply from fixed-line phone', and (d) 'sending voice emails in a way that the email sent to the recipient's email address contains a link to the voice file where the voice file is stored on a computer server and is retrieved when the recipient clicks on the link in the email or visits the server using internet or intranet'.

VII. Voice Messaging to/from a Phone

The service is to 'send/receive voice messages to/from a phone'. In this service, electronic addresses of the user and service provider are capable of sending/receiving voice calls. The user at Mi registers at Pj the phone number Qj of another person. When he calls Pj and leaves a voice message, the service provider makes a recording of the message, and delivers it to Qj. Similarly for a call from Qj to Pj, a voice recording is made and delivered to Mi. The service provider ensures that when Mi registers Qj at Pj, no other user registers Qj at Pj for the voice message from Qj to Pj to be delivered to Mi. The delivery of voice message from Pj to Qj and from Pj to Mi is done as per settings. Instances of delivery from Pj to Qj include: push an SMS notification from Pj to Qj, inviting Qj to call in to listen, or just call from Pj to Qj and deliver and so on. Two sets of service provider's numbers may also be used, one from user to the service provider and the other from service provider to the user.

VIII. Missed Call Alert Notification Service

In this case, the electronic addresses of the user and the service provider are capable of receiving and sending SMS. Many service providers push an SMS notification if a mobile phone subscriber misses an incoming call for whatever reason. Typically the SMS reads like '90214091 was trying to call you at 9 am Mar. 12, 2003'. The user has to open the SMS to know who the caller was and even then may not be able to recognize who the caller was from the phone number in the SMS. In this example embodiment, the service covered is 'missed call alert notification'. The user at Mi registers at Pj the phone number Qj for the service. When the user at Mi misses a call from a number Q and service provider generates a notification for missed call for Mi, it further checks to see if Q is registered by the said user at any of the service provider's numbers for this service. If it is registered say at Pj, the service provider sends the SMS notification for the missed call to Mi from Pj. The SMS notification itself may include more information about the missed call from Qj (for instance if the user Mi has registered a name for Qj say 'Raj' the SMS notification could say 'Raj at Qj was trying to call you at 9 am Mar. 12, 2003'. The user at Mi, even before opening the SMS to make its content, will be able to tell that he missed a call from 'Raj' if he has stored Pj in his phone-book under 'MC fm Raj'.

In addition, the user may sign for this missed call notification alert to be sent to his designated email address along with his mobile number with a suitable subject such as 'missed call from Raj at Qj' and from an email address such as 'Raj mscall@serviceprovider.com' to clearly identify the notification and the caller whose call is missed in user's email system. The user may also sign for this notification to be saved in an on-line account under the heading 'missed call notification from Raj'. Same is true for missed call notifications for calls missed from other users.

IX. Sending Voice/Fax Messages when only Phone Number of Intended Recipient is Known In many cases, a user at Mi wishes to send a voice/fax message to a person about whom he only knows a phone number. Unlike the system and method in VII, the user may not wish this message to be delivered to/retrieved by the intended person at his phone for whatever reasons. Instances of such situations include knowing mobile phone number of the intended person and wanting to deliver a fax, knowing the mobile phone number of the intended person which incurs charges when contacted directly by the user using Mi. In this case the service is 'sending voice/fax communications on the internet when only phone number of intended recipient is known'.

The electronic address of the user Mi and the service provider Pj must be capable of sending and receiving voice and/or fax calls. The user at Mi registers at Pj, the phone number Qj of the intended person for the said communication. When the user initiates a contact using Mi at Pj, the service provider receives the voice/fax communication, creates an on-line account for Qj (with password protection), sends a suitable notification to Qj (including identity of sender and account access information such as the web-site address, account name, password etc), and makes the voice/fax file available to Qj when he uses the web-site to retrieve the information. Other functions may be provided to further facilitate the retrieval of the information. The sender does not need to know anything more than the phone number of the intended recipient. This notification to Qj can be an SMS notification if Qj is a mobile number or a voice call if Qj is not capable of receiving a SMS notification.

X. Service of Making/Receiving Anonymous Phone Calls

For this service, an example embodiment is such that the electronic addresses of a user and a service provider are phone numbers. The service is that the user wishes to make an anonymous call from his phone Mi to another person's phone Qj.

Figure 12:
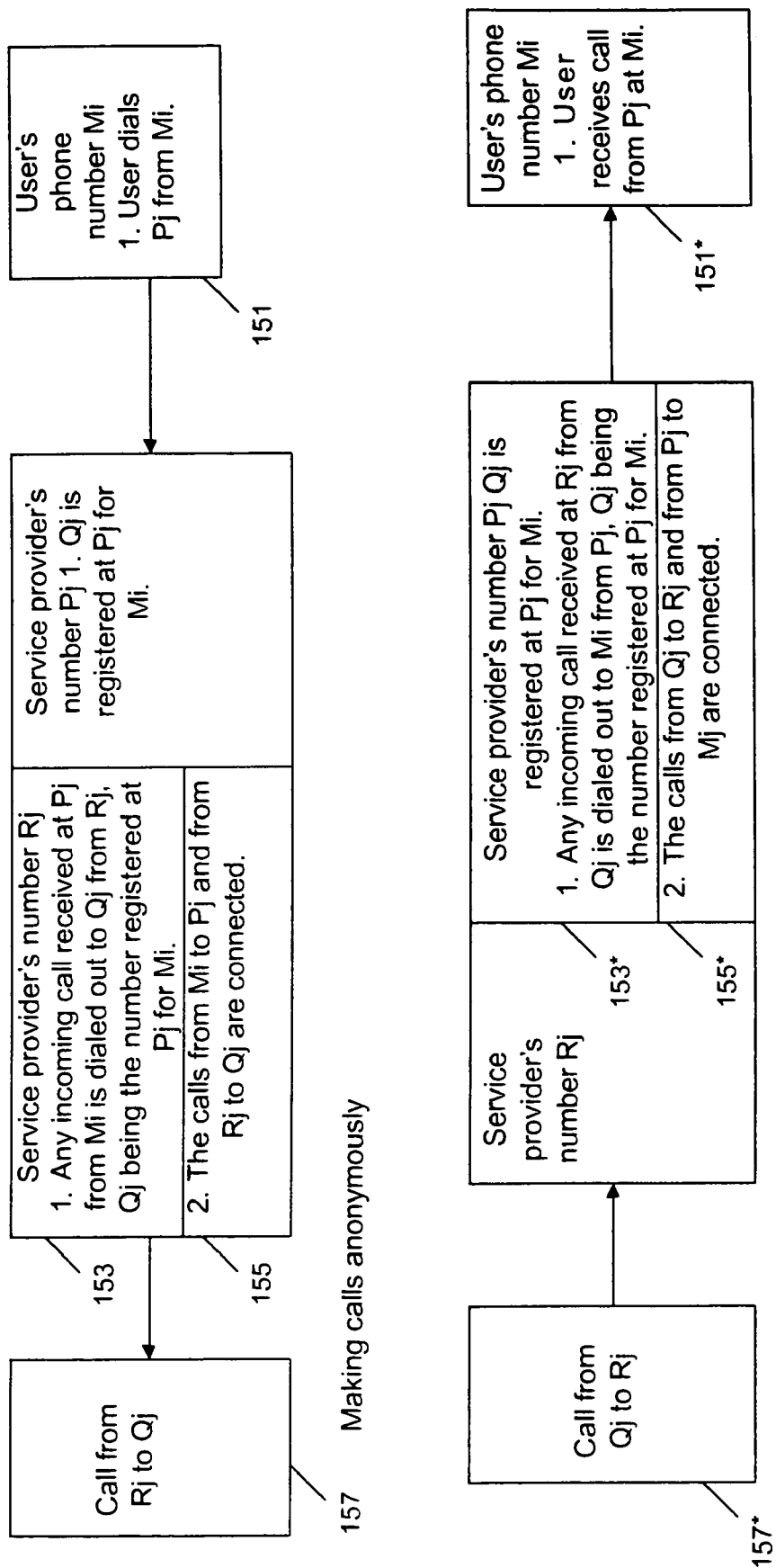
FIG. 12 is a flow chart illustrating a communication sequence in an example embodiment of the present invention.

With reference to FIG. 12, at the start, the user registers Qj at Pj for this service.

Thus, when he calls Pj, the service provider calls Qj from another number Rj and connects the two calls so that a conversation between Mi and Qj can take place. The service provider's numbers Pj and Rj are paired and could be same in those instances where a call can be received at and dialed from the same number simultaneously.

At step 151, the user at Mi calls Pj.

At step 153, the service provider calls Qj from Rj. The user at Mi can store Pj in his phone-book as 'Raj ANMS' to denote that it is meant for calling Raj anonymously. Rj may even be a private number.

At step 155, the service provider connects the call from Mi to Pj with the call from Rj to Qj.

In step 157, targeted user Qj receives a call from Rj.

This system and method works when the service also includes reply that is service is 'make and receive anonymous calls'. In this case the user at Mi wishes to call a person at Qj anonymously and also would want that person at Qj to be able to call him back at Mi without knowing Mi.

To begin with, the user at Mi registers Qj with the service provider at Pj and gives Rj to the person at Qj.

In this case, the user at Mi calls service provider at Pj and the service provider calls Qj from Rj and connects the two calls. Rj may even be a private number.

For reply, in step 157*, the person at Qj calls Rj.

The service provider knows that it is a call for the user at Mi from the caller-ID Qj of the caller.

Hence, the service provider calls Mi from Pj in step 153*.

After that, in step 155*, the service provider connects the two calls. For this method to work, the service provider has to ensure that no other user registers Qj at Pj. If a user other than the user at Mi wishes to make/receive anonymous phone calls to Qj, the service provider assigns a number different from the one assigned to Qj for Mi.

Finally, in step 151*, the user with number Mi receives the call from Pj.

This service can be extended when both parties wish to remain anonymous to each other. Say their numbers are Mi and Ui. In this case both of them subscribe to this service with their service providers. The user at Mi registers that he wishes to use this service and gets a pair of numbers Pj & Rj. Similarly the user at Ui registers that he wishes to use this service and gets a pair of numbers Sj & Tj. The user at Mi gives the user at Ui the number Rj and the user at Ui gives the user at Mi the number Tj. Thus the user at Mi only knows Tj and the user at Ui only knows Rj. They now return back to their service providers. The user at Mi register Tj as the destination number for his calls to Pj and the user at Ui registers Rj as the destination for his calls to Sj.

When the user at Mi calls Pj, it triggers a call to Tj from Rj. Based on caller-ID of Rj, a call to Tj from Rj triggers a call from Sj to Ui. All these calls are then connected. A similar scenario exists when the user at Ui calls Sj. For this method to work no other users besides the ones at Mi and Ui can be assigned the numbers Tj at Pj and Rj at Sj.

XI. Service of Sending/Receiving Anonymous SMS

Based on the description of the system and method for making anonymous phone calls in the previous method, the system and method for sending/receiving anonymous SMS and the system and method for sending/making/receiving voice calls as well as SMS will be obvious to those skilled in the art.

XII. Other Services such as Calling Cards/Access to Accounts

The service is make a 'calling card call' to a person with phone number Qj. This done by the user at Mi registering at Pj the entire calling card sequence followed by the number Qj (including pauses, #, * etc). Now when the user at Mi calls Pj, the service provider dials out the entire sequence stored by the user and connects the call. Other instances of this service include automatic access to bank account information and direct access to certain information in IVRS systems.

XIII. Service of Recording Calls

The service is 'recording a voice call'. The user at Mi registers a phone number Qj at Pj for this service. When the user at Mi calls Pj, the service provider calls Qj from another number Rj and connects the two calls while also making a recording of the call. The user at Mi may then be given access to the recording via a suitable delivery means such as internet, emailing, physical delivery, calling etc.

XIV. Service of Conference Calling

The service is taking a conference call'. The user at Mi registers a set of phone number [Aj, Bj, . . . ] at Pj for this service. When the user at Mi calls Pj, the service provider calls the set of numbers registered at Pj simultaneously and establishes a conference call among these numbers. The call may even be recorded by the service provider as per user settings.

XV. Service of Emergency Calling

The service is 'emergency calling'. The electronic address of the user and the service provider are phone numbers capable of making/receiving phone calls. In this service, the user does not wish to take a call from a person unless it is an emergency call from that person. Instances include the user being in a meeting and not wanting to take a call from anyone unless it is an emergency call from wife. Hence he may reject a call if he sees on his phone that it is his wife calling as the call is received. Ordinarily the user may decide to call back later say after the meeting. But there are situations when the wife really would like the user to take the call, say if there is an accident. Hence there is a need for a system and method for a user to be able to know that it is an emergency call as the call comes in without taking any actions such as take the call and ask if it is urgent or have it forwarded to some answering service etc. Further the user may not wish to receive emergency calls from everyone. Only those who he authorizes should be able to call him as 'emergency call'.

The system and the method work as follows. The user at Mi registers the wife's phone number Qj at the service provider's number Pj for this service and stores Pj in his phone-book as 'EMR form Wife'. The service provider's numbers Pj and Rj work in pairs. The user gives Rj to his wife to use if she wishes to reach him in emergency situation. The wife can store Rj in her phone-book as 'EMR to Hbby'. Under ordinary situation she will call Mi directly from Qj (go to phone-book, select 'hbby', and call). When there is any emergency situation, the wife calls Rj (go to phone-book, select *EMR to Hbby', and call) which triggers a call from Pj to Mi after the service provider checks to see if Qj is registered for the service and at what number of the service provider. Then the service provider connects the two calls. The user's phone at Mi shows an incoming call from 'EMR form Wife'. The user may also program a special ring-tone or other modes (loud rings, vibration, etc) if the call comes in from Pj. Further the user may register at Pj with the service provider to not only connect the call, but also send SMS, call/SMS other parties, send emails etc from preset electronic addresses and so on. The user at Mi can register different person's numbers at different service provider's numbers P1, P2, and so on in order to determine if it an emergency situation from wife or child or parents and so on.

In another embodiment, the system and the method work as follows. The user at Mi registers his wife's phone number Qj at the service provider's number Pj for this service and stores Pj in his phone-book as 'EMR to Wife'. He then gives Rj to his wife to put in her phone-book as 'EMR form Hbby'. Under ordinary the user calls Qj from Mi directly (go to phone-book, select 'Wife', and call). When there is any emergency situation, he calls Pj (go to phone-book, select 'EMR to Wife', and call) which triggers a call from Rj to Qj and the service provider connects the two calls. The wife's phone shows an incoming call from 'EMR form Hbby'. The wife may also program a special ring-tone or other modes (loud rings, vibration, etc) if the call comes in from Rj. Further the user at Mi may register Qj with the service provider at Pj to not only connect the call to Qj, but also register other electronic addresses to send SMS, call/SMS other parties, send emails etc from preset electronic addresses and so on when he calls Pj. The user at Mi can register different person's numbers at different service provider's numbers in order to call different persons under different emergency situations.

It will be appreciated by those skilled in the art that both husband at Mi and wife at Qj can subscribe to this service where the husband registers Tj at Pj and wife registers Rj at Sj along with other electronic addresses. Pj is paired with Rj and Sj is paired with Tj. A call from Qj in emergency situation is made to Sj which triggers a call from Tj to Rj that are connected. The call from Tj to Rj triggers a call from Pj to Mi that are connected. Thus the wife is able to notify not only her husband but others as well with one call in emergency situation and the husband is able to set his preferences and enable communications accordingly when he receives an emergency call from the wife. Finally it will be appreciated by those skilled in the art that both husband and wife can subscribe to the service in a way that in an emergency situation with the wife, she can call husband and receive call from him if he is in emergency situation at the same number. She could then store that number in her phone-book at 'EMR Hbby'.

XVI. Service of Voice Mail Retrieval

In this example embodiment, the electronic addresses of the user and the service provider are capable of making and receiving voice calls and the service is 'voice mail retrieval'. Many service providers push an SMS notification if there is voice mail for a mobile phone subscriber for whatever reason. Typically the SMS reads like '90214091 has left a voice message for you at 9 am Mar. 12, 2003'. The user has to open the SMS to know who the caller was and even then may not be able to recognize who the caller was from the phone number in the SMS. Also the service providers provide a single number for the users to call in and retrieve their voice mails using IVRS that can be cumbersome and time-consuming. In this example embodiment, the service covered is 'voice mail retrieval'.

Figure 13:
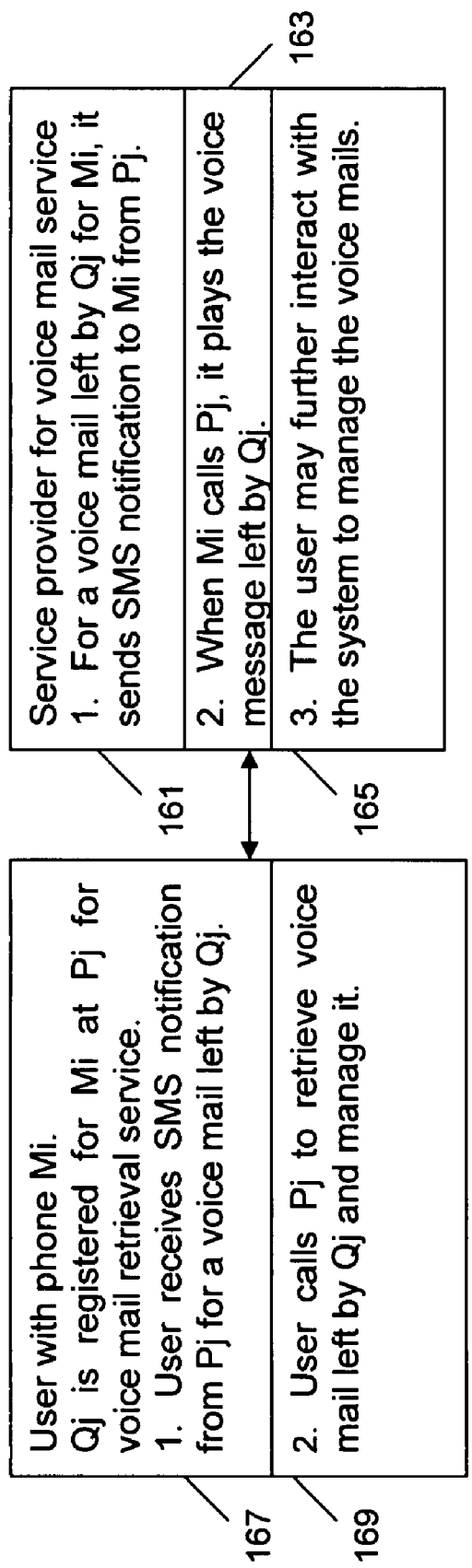
FIG. 13 is a flow chart illustrating a communication sequence in an example embodiment of the present invention.

With reference to FIG. 13, at the start, the user at Mi registers at Pj the phone number Qj for the service.

When there is a voice message for the user from a number Qj, service provider generates a notification for the voice message for Mi. Next, the service provider checks its database in a manner similar to the one previously described to see if Qj is registered by the user at any of the service providers numbers for this service.

On the service provider side, in step 161, if Qj is registered say at Pj, the service provider sends the SMS notification for the voice message to Mi from Pj and stores the voice message in such a way that it could be played to the user at Mi when he calls into Pj. The SMS notification itself may include more information about the voice message from Qj. For instance, if the user Mi has registered a name for Qj say 'Raj' the SMS notification could say 'Raj at Qj left a voice message for you at 9 am Mar. 12, 2003'. The user at Mi, even before opening the SMS to read its content, will be able to tell that he has a voice message from 'Raj' if he has stored Pj in his phone-book under 'VM fm Raj'.

On the user side, after receiving the SMS notification from Pj for a voice mail left by Qj in step 167, the next step 169 is the user calls into Pj directly to retrieve voice mail from the phone number Qj. At this point, the user is also capable of managing the voice mail, e.g. rewinding and replaying the voice mail etc. Even if there is no notification (for instance fixed line phones) or the user does not recall or has deleted it, he can still call into Pj to check if there is any voice message from Qj. This method is useful for the user to know and retrieve voice messages from important persons in a fast manner.

Back on the service provider side, in step 163, once Mi calls Pj, the service provider will play the voice message left by Qj.

At step 165, the user may further interact with the system at the service provider to manage the voice mails.

In addition, the user at Mi may sign for this voice message to be sent to his designated email address along with SMS notification at his mobile number Mi with a suitable subject such as 'voice message from Raj at Qj' and from an email address such as 'Raj vm@serviceprovider.com' to clearly identify the caller whose voice message is being sent in user's email system. The user may also sign for this voice message to be saved in an on-line account under the heading 'voice message from Raj'. All of these things may be done together thereby giving user the choice of retrieving voice messages by either calling the voice mail system or via an on-line account or from the email system. Same is true for voice messages from other users.

It will be appreciated by those skilled in the art that this system and the method can also be used by users to register different originating phone numbers for incoming faxes and voice messages into a unified messaging service (UMS) provider's system and have them delivered into the user's email accounts from different email addresses of the service provider and with different subjects depending on the caller-ID of the originating phone numbers.

XVII. Service of Advertising and Other Information Services

In this case, the service is 'advertising and other similar information services'. The electronic addresses of the user and the service provider are phone numbers. In one instance of this service for advertising, the user at Mi registers a mobile phone number Qj at Pj. For any SMS that the user wishes to send to Qj, he now sends it from Mi to Pj, the service provider appends a suitable advertisement (which may also lead to transformation of SMS to one or more SMSs or MMSs) and then sends that communication to Qj. Several other variations are possible. The service provider may encourage users to register for listening to information messages at Pj before connecting the call to Qj. The user may also wish the service provider to add information messages during the call (such as background audio).

XVIII. Service of Information/Reminder Notification

In this case the service is 'information and reminder notification'. In most embodiments, these types of services are SMS based. The electronic addresses of the user and the service provider must be able to receive and send SMS. An instance of this service is song notification when radio station is to play it. Different users may wish to be notified via SMS of different songs as the radio station is about to play it. The users register different songs at different numbers. When the radio station is about to play the song that the user at Mi has registered for notification at Pj, the service provider sends an SMS notification from Pj to Mi. This way the user knows which song it is even before opening the SMS if Pj is stored in his phone-book under a heading for the song.

Similar description is also possible for reminder services when different reminders or different types of reminders are sent from different numbers for the ease of the user.

Service of Music/Information Delivery

In this case, the service is 'music/information delivery' and the electronic addresses of the user and the service provider are phone numbers. In this service, the user will register one or more audio messages (songs, music, speeches, audio-books etc) to be played to him when he calls Pj using Mi. Audio messages at different service provider's numbers are different for the user at Mi and different users select their own audio messages for listening. These audio messages may be selected from a menu offered by the service provider, third parties, and could even be uploaded to the service provider's data-base by the user using well known techniques for information transfer using the internet. The user at Mi may call into Pj or choose settings such that Pj calls Mi and listen to the audio message that he selected or uploaded.

This system and a method can be used to offer music to the users in a way that they pay for it when they access it using their phones.

Services from Email Accounts and IM

Many of the services described above have been described in the telephony domain when the electronic address of the user and the service provider were phone numbers. It will become apparent to those skilled in the art that similar services can also be described when the electronic addresses are either email or IM addresses. For instance a service of sending group SMS to all the numbers registered by Mi at Pj when Mi sends an SMS to Pj, can also be translated to a service of 'group SMS'. Now an email sent by the user using an email address Mi to an email address Pj will be converted to SMS and sent as SMS to those phone numbers registered for an email sent from Mi to the email address Pj. Same goes for IM addresses. The delivery of such services from email and/or IM accounts further facilitates the user. For instance, now he may send anonymous emails by selecting a suitable email address from his email address book. For emergency service, an IM sent from Qj to Pj (user with IM address Mi registers IM address Qj for the emergency service at IM address Pj) is picked up by the service provider. It is then delivered to the user at Mi from Pj along with other things that the user may set the system for including calling, sending SMS to one or more persons including him, sending emails, IM and so on.

Service of Retrieving Information from Web-Sites

In this case the service is 'retrieving information from web-sites'. The electronic addresses of the user and the service provider are phone numbers. The user at Mi selects certain information on a web-site of his preference (stock quotes, weather reports etc) and registers to have it delivered to him at Pj. Information at different service provider's numbers is different for the user at Mi and different users select their own information for the service. Delivery may involve the service provider sending SMS/calling Mi from Pj or the user sending SMS/calling the service provider at Pj depending on the user settings, preferences and nature of information.

Service of Call-Back

In this case the service is 'call-back' and the electronic addresses of the user and the service provider are phone numbers. In many cases the user at Mi would like to call Qj in a way that it is a call-back to Mi. The user registers Qj at Pj for this service of callback. When he wants to call Qj, he establishes a contact with Pj instead. This contact can be an SMS sent from Mi to Pj in no particular format or a quick call and hang-up after one or more rings from Mi to Pj or some other equivalent contact. This triggers the service provider to establish a call to Qj and Mi and connect the two calls.

Service for Anonymous Sending of Items to a Physical Address

In this case the service is 'anonymous sending of physical items to physical addresses'. In two example embodiments that is achieved by way of utilizing electronic addresses associated with physical addresses at the service provider, and, by way of utilizing electronic markers associated with physical addresses at the service provider, respectively.

Figure 16:
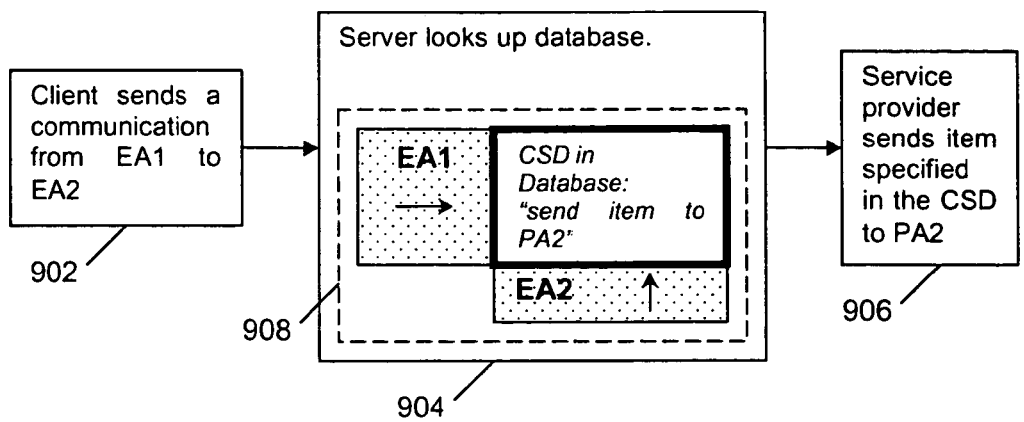
FIG. 16 is a flow chart illustrating a communication sequence in an example embodiment of the present invention.

With reference to FIG. 16, an example embodiment describing the service by way of utilizing electronic addresses associated with physical addresses at the service provider is as follow.

To begin with, in step 902, a client who has pre-registered the service with the CSD of 'send an item if communication received from EA1 on EA2 to PA2. The client then sends a communication from an Electronic address (EA1) to the service provider's server Electronic Address (EA2). The item to be sent must be specified by the client at the time of client registration.

At step 904, the server looks up its database 908 of pre-registered CSDs utilizing EA1 and EA2 to identify the specific CSD.

Once the server identifies the CSD, in step 906, the server sends off the item to PA2. As an example, a paper note may be printed by the server stating the CSD requested by the client and a staff at the service provider acts on the request by preparing the item and send it off to PA2 through the local Post Office. In another example embodiment, the server may be connected to an electronic warehouse, thus further reducing any human input into the service provision.

Hence, utilizing this method, the physical address and identity of the sender is not revealed to the recipient of the item.

Figure 17:
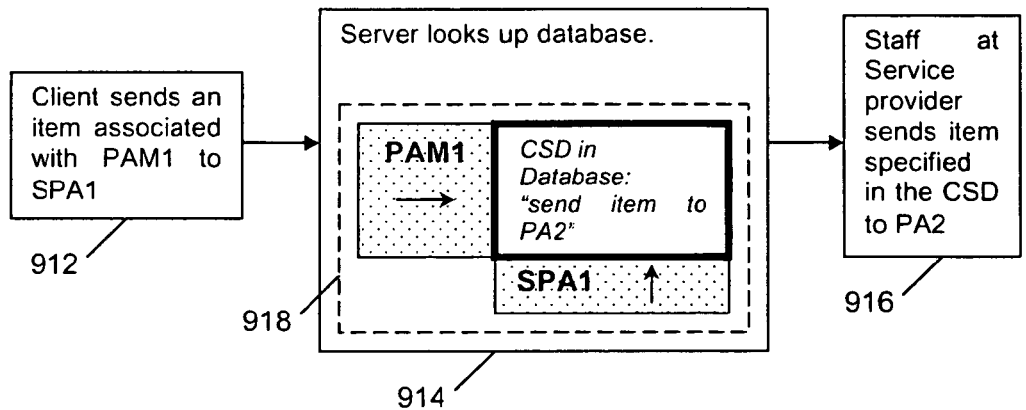
FIG. 17 is a flow chart illustrating a communication sequence in an example embodiment of the present invention.

With reference to FIG. 17, an example embodiment describing the service by way of utilizing electronic markers associated with physical addresses at the service provider is as follows.

To begin with, in step 912, a client who has pre-registered the service with the CSD of 'send item associated with electronic marker PAM1 received at SPAL to PA2'. The client then sends an item tagged with a Physical Address Marker (PAM1) to the Service provider's Physical Address (SPA1). This marker can be a barcode tag or Radio Frequency Identification Device (RFID) tag or the like.

At step 914, upon receiving the item from the client, a staff at the service provider e.g. scans PAM1 using a barcode reader (assuming PAM1 is a barcode tag) that is connected to a server at the service provider. Once the server receives the scanned data, the server looks up a database 918 residing in it or in another computer of a connected computer network. Utilizing the barcode number of PAM1 and SPA1, the server then identifies the specific CSD in the database.

Once the CSD is identified, in step 916, the staff at the service provider sends off the item to PA2. As an example, a paper note stating the specific CSD requested by the client may be printed by the server. The staff at the service provider then acts according to the description of the CSD by sending off the item to PA2 through the local Post Office.

Hence, similarly, utilizing this second method, the physical address and identity of the sender is not revealed to the recipient of the item.

Also SPA1 and PA2 can be electronic address based physical address of the kind 'abc@yahoo.com, 1234 Anystreet, Anytown, Anystate, 12345'. The electronic address based PA2 for the recipient may be created on the fly if it does not exist beforehand and the recipient can be notified of the item and asked to arrange for its delivery via his electronic address. Thus one may send/receive a physical item to/from another person knowing only the electronic addresses.

It will appreciated by a person skilled in the art that the methods described above with reference to FIGS. 16 and 17, can be readily modified or extended to relate to anonymous receipt of items by the client. In one embodiment a scenario can be realized in which neither party to the exchange knows the others physical address and identity.

Figure 18:
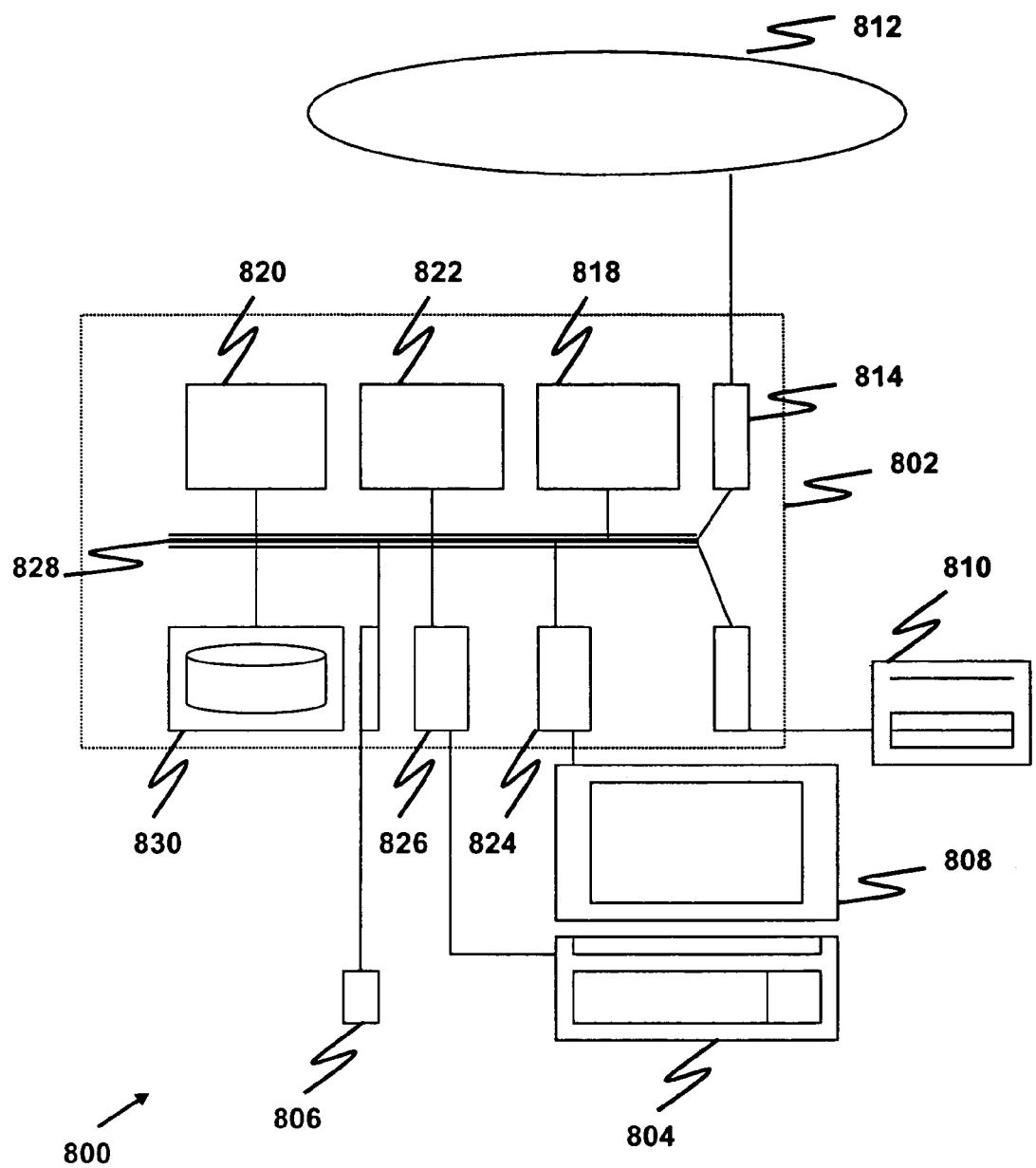
FIG. 18 is a schematic drawing of a computer system for use in implementation of an example embodiment of the present invention.

It will be appreciated by a person skilled in the art that the methods and systems of the example embodiment can be implemented utilizing a computer system 800, schematically shown in FIG. 18. It may be implemented as software, such as a computer program being executed within the computer system 800, and instructing the computer system 800 to conduct the method of the example embodiment.

The computer system 800 comprises a computer module 802, input modules such as a keyboard 804 and mouse 806 and a plurality of output devices such as a display 808, and printer 810.

The computer module 802 is connected to a computer network 812 via a suitable transceiver device 814, to enable access to e.g. the Internet or other network systems such as Local Area Network (LAN) or Wide Area Network (WAN).

The computer module 802 in the example includes a processor 818, a Random Access Memory (RAM) 820 and a Read Only Memory (ROM) 822. The computer module 802 also includes a number of Input/Output (I/O) interfaces, for example I/O interface 824 to the display 808, and I/O interface 826 to the keyboard 804.

The components of the computer module 802 typically communicate via an interconnected bus 828 and in a manner known to the person skilled in the relevant art.

The application program is typically supplied to the user of the computer system 800 encoded on a data storage medium such as a CD-ROM or floppy disk and read utilizing a corresponding data storage medium drive of a data storage device 830. The application program is read and controlled in its execution by the processor 818. Intermediate storage of program data maybe accomplished using RAM 820.

Embodiments of the present invention can provide the following advantages:

1) Allows the simplicity of making/receiving regular voice calls and/or sending/receiving regular SMS for numerous services.
2) Simple to use and non-limiting in their utility for the consumer.

The concept of simplicity apparent in the embodiments are based on the following user experiences:

(A) The user experience of making a voice call—"pick a phone number (from phone-book or otherwise) and dial it (or the phone can dial it out at the touch of a button), talk and hang up" is very powerful due to its simplicity thereby enabling its wide-spread use.

(B) The user experience of sending a SMS—"enter the text, pick a phone number (from phone-book or otherwise) and send the SMS at the touch of a button" is very powerful due to its simplicity thereby enabling its wide-spread use.

(C) The user experience of managing an incoming voice call—"pick the receiver or press a button to receive a call, talk and hang up" is very powerful due to its simplicity thereby enabling its wide-spread use. The caller-ID information can be used in a variety of ways to manage the call (reject it, different ring-tones for different calling numbers etc).

(D) The user experience of receiving a SMS—"just click on the proper button on the phone to open and read the SMS" is very powerful due to its simplicity thereby enabling its wide-spread use. The caller-ID information can be used in a variety of ways to manage the SMS (reply, read it now vs later, urgent vs non-urgent etc).

(E) The user experience of managing emails from a PC (connected to internet) is simple. Use of address book in the email system makes it simple for the user to manage email communications.

(F) The user experience of managing instant messaging (IM) from a PC (connected to internet) is simple. Use of address book in the IM system makes it simple for the user to manage IM communications.

In the first four instances (A)-(D), the user experience was simple. However the communication (only voice call, SMS) was limited—"The user used a phone (mobile, fixed-line) only and calling/sending/receiving took place from/to a phone number." Similarly, in the last two instances (E)-(F), the user experience of managing messaging (emails, IM) from PC (connected to internet) is simple. However it is limited to "sending/receiving emails (or IM) from one email address (or IM address) to another."

Hence, in one aspect of the example embodiments that was describe here, the objective is to remove the limitations of the simple user experience associated with using the phone or the PC. In another aspect of the example embodiments that was describe here, the objective is to bring about the simplicity of the user experience to other specific aspects of communication besides making/receiving voice calls, sending/receiving SMS from a phone, and managing emails from a PC.

It will further be appreciated by a person skilled in the art that another advantage of embodiments of the present invention is their independence of the telephone company switches. Rather, the system and the method in embodiments of the present invention is provided simply via the server phone addresses, for those applications where the service is provided via a plurality of server phone numbers.

In the foregoing manner, methods and systems for providing a service are disclosed. Several embodiments are described. It will be apparent to one skilled in the art in view of this disclosure that numerous changes and/or modifications may be made without departing from the scope of the invention.

What is claimed is:

1. A method of providing a service, comprising the steps of;
performing a communication to one of a plurality of server electronic addresses of a communication server from a first electronic address;
identifying, at the communication server, the first electronic address from which the communication is made;
providing a service based on a pre-stored service definition at the communication server, the pre-stored service definition being identified by the communication server by a combination of the server electronic address and the first electronic address such that different service definitions apply for different combinations of different server electronic addresses with an identical first electronic address and for different combinations of the server electronic address with different first electronic addresses;
wherein the pre-stored service definition comprises one or more second electronic addresses for execution of the service; and
wherein the service comprises providing at least a content of the communication to the one or more second electronic addresses.

2. The method as claimed in claim 1, wherein the service definition is set up by a person associated with the first electronic address.

3. The method as claimed in claim 1, wherein the service definition is set up by a person associated with the second electronic addresses.

4. The method as claimed in claim 1, wherein the one or more second electronic addresses include at least one of the first electronic address and the server electronic address.

5. The method as claimed in claim 1, wherein the service definition comprises one or more of a group comprising making a voice call to the one or more second electronic addresses, leaving a message at the one or more second electronic addresses, sending an email to the one or more second electronic addresses, sending an SMS to the one or more second electronic addresses, sending a fax to the one or more second electronic addresses, sending an IM to the one or more second electronic addresses, sending an MMS to the one or more second electronic addresses, making a calling card call to the one or more second electronic addresses, making an access sequence call to the one or more second electronic addresses, sending audio data to the one or more second electronic addresses, sending video data to the one or more second electronic addresses, and sending multi-media data to the one or more second electronic addresses.

6. The method as claimed in claim 1, wherein the service definition comprises one or more of a group comprising receiving a voice call from the one or more second electronic addresses, recording a message from the one or more second electronic addresses, receiving an email from the one or more second electronic addresses, receiving an SMS from the one or more second electronic addresses, receiving a fax from the one or more second electronic addresses, receiving an IM from the one or more second electronic addresses, receiving an MMS from the one or more second electronic addresses, receiving a calling card call from the one or more second electronic addresses, receiving an access sequence call from the one or more second electronic addresses, receiving audio data from the one or more second electronic addresses, receiving video data from the one or more second electronic addresses, and receiving multi-media data from the one or more second electronic addresses.

7. The method as claimed in claim 1, wherein contacting the server electronic from the first electronic address comprises one or more of a group comprising making a voice call to the server electronic address, sending an email to the server electronic address, sending an SMS to the server electronic address, sending a fax to the server electronic address, sending an IM to the server electronic address, sending an MMS to the server electronic address, making a calling card call to the server electronic address, making an access sequence call to the server electronic address, sending audio data to the server electronic addresses, sending video data to the server electronic addresses, and sending multi-media data to the server electronic addresses.

8. The method as claimed in claim 1, wherein the service definition comprises conversion of one communication format into another communication format.

9. The method as claimed in claim 1, wherein the service definition comprises recording a communication at least one of to and from the one or more second electronic addresses.

10. The method as claimed in claim 1, wherein the service definition comprises a third electronic address, and the execution of the service comprises contacting the second electronic address from the third electronic address.

11. The method as claimed in claim 1, wherein the service definition comprises a third electronic address, and the execution of the service comprises contacting the second electronic address from the third electronic address and connecting the third electronic address to the server electronic address.

12. A system for providing a service, the system comprising:
an electronic device having a first electronic address;
a server having associated with it a plurality of server electronic addresses;
a database accessible by the server;
wherein the electronic device performs a communication to one of the server electronic addresses;
the server identifies the first electronic address from which the communication is made;
the server initiates a service based on a service definition stored in the database depending on a combination of the server electronic address and the first electronic address such that different service definitions apply for different combinations of different server electronic addresses with an identical first electronic address and for different combinations of the server electronic address with different first electronic addresses;
wherein the service definition comprises one or more second electronic addresses for execution of the service; and
wherein the service comprises providing at least a content of the communication to the one or more second electronic addresses.

13. The system as claimed in claim 12, wherein the server further comprises a user-interface unit for setting up the service definition by a person associated with the first electronic address.

14. The system as claimed in claim 12, wherein the server further comprises a user-interface unit for setting up the service definition by a person associated with the second electronic addresses.

15. The system as claimed in claim 12, wherein the one or more second electronic addresses include at least one of the first electronic address and the server electronic address.

16. The system as claimed in claim 12, wherein the service definition comprises one or more of a group comprising making a voice call to the one or more second electronic addresses, leaving a message at the one or more second electronic addresses, sending an email to the one or more second electronic addresses, sending an SMS to the one or more second electronic addresses, sending a fax to the one or more second electronic addresses, sending an IM to the one or more second electronic addresses, sending an MMS to the one or more second electronic addresses, making a calling card call to the one or more second electronic addresses, making an access sequence call to the one or more second electronic addresses, sending audio data to the one or more second electronic addresses, sending video data to the one or more second electronic addresses, and sending multi-media data to the one or more second electronic addresses.

17. The system as claimed in claim 12, wherein the service definition comprises one or more of a group comprising receiving a voice call from the one or more second electronic addresses, recording a message from the one or more second electronic addresses, receiving an email from the one or more second electronic addresses, receiving an SMS from the one or more second electronic addresses, receiving a fax from the one or more second electronic addresses, receiving an IM from the one or more second electronic addresses, receiving an MMS from the one or more second electronic addresses, receiving a calling card call from the one or more second electronic addresses, receiving an access sequence call from the one or more second electronic addresses, receiving audio data from the one or more second electronic addresses, receiving video data from the one or more second electronic addresses, and receiving multi-media data from the one or more second electronic addresses.

18. The system as claimed in claim 12, wherein contacting the server electronic address from the first electronic address comprises one or more of a group comprising making a voice call to the server electronic address, sending an email to the server electronic address, sending an SMS to the server electronic address, sending a fax to the server electronic address, sending an IM to the server electronic address, sending an MMS to the server electronic address, making a calling card call to the server electronic address, making an access sequence call to the server electronic address, sending audio data to the server electronic addresses, sending video data to the server electronic addresses, and sending multi-media data to the server electronic addresses.

19. The system as claimed in claim 12, wherein the server converts one communication format into another communication format as part of the initiating of the service.

20. The system as claimed in claim 12, wherein the server records a communication at least one of to and from the one or more second electronic addresses as part of the execution of the service.

21. The system as claimed in claim 12, wherein the service definition comprises a third electronic address, and the execution of the service comprises contacting the second electronic address from the third electronic address.

22. The system as claimed in claim 12, wherein the service definition comprises a third electronic address, and the execution of the service comprises contacting the second electronic address from the third electronic address and connecting the third electronic address to the server electronic address.

23. A computer readable medium having stored thereon computer readable code means for instructing a computer controlled system to execute a method of providing a service, the method comprising the steps of;

performing a communication to one of a plurality of server electronic addresses from a first electronic address;

identifying, at the server electronic address, the first electronic address from which the communication is made;

providing a service based on a service definition depending on a combination of the server electronic address and the first electronic address such that different service definitions apply for different combinations of different server electronic addresses with an identical first electronic address and for different combinations of the server electronic address with different first electronic addresses;

wherein the service definition comprises one or more second electronic addresses for execution of the service; and wherein the service comprises providing at least a content of the communication to the one or more second electronic addresses.

24. The method as claimed in claim 12, wherein the communication comprises a voice call, the service definition further comprises a third electronic address, wherein the first, second and third electronic addresses comprise respective phone numbers; and a server making a phone call to the second electronic address from the third electronic address, and connecting the first electronic number to the second electronic number via the server electronic number and the third electronic number, such that at least voice content of the communication is provided to the second electronic address.

25. The system as claimed in claim 1, wherein the communication comprises a voice call, the service definition further comprises a third electronic address, wherein the first, second and third electronic addresses comprise respective phone numbers; and the server making a phone call to the second electronic address from the third electronic address, and connecting the first electronic number to the second electronic number via the server electronic number and the third electronic number, such that at least voice content of the communication is provided to the second electronic address.

* * * * *

UNITED STATES PATENT AND TRADEMARK OFFICE
CERTIFICATE OF CORRECTION

PATENT NO. : 7,493,381 B2
APPLICATION NO. : 10/862888
DATED : February 17, 2009
INVENTOR(S) : Hari Krishna Garg It is certified that error appears in the above-identified patent and that said Letters Patent is hereby corrected as shown below:

Column 1, Line 65;
"telephony" should be --telephone--.

Column 2, Line 63;
"gods" should be --goods--.

Column 3, Line 31;
After "address", insert --.--.

Column 4, Line 32;
After "provided", insert --a--.

Column 7, Line 30;
After "Description", "." Should be --:--.

Column 8, Line 23;
After "@hotmail.com"," insert a space.

Column 10, Line 3;
"eliminates" should be --eliminate--.

Column 10, Line 15;
"lookups" should be --looks up--.

Column 10, Line 38;
"SMS/MMSNoice" should be --SMS/MMS/Voice--.

Column 10, Line 42;
"examples" should be --example--.

Column 13, Line 2;
"lookups" should be --looks up--.

Column 16, Line 43;
"features" should be --feature--.

Column 16, Line 67;
After "will", insert --be--.

UNITED STATES PATENT AND TRADEMARK OFFICE
CERTIFICATE OF CORRECTION

PATENT NO. : 7,493,381 B2
APPLICATION NO. : 10/862888
DATED : February 17, 2009
INVENTOR(S) : Hari Krishna Garg It is certified that error appears in the above-identified patent and that said Letters Patent is hereby corrected as shown below:

Column 20, Line 30;
After "can", insert --call--.

Column 20, Line 49;
"use" should be --used--.

Column 20, Line 55;
After "'buddy group'", insert --.--.

Column 20, Line 63;
"till" should be --until--.

Column 21, Line 49;
After "at", delete "a".

Column 23, Line 47;
After "embodiment", insert --of--.

Column 23, Line 62;
"(1,i)" should be --(j,i)--.

Column 24, Line 11;
"a" should be --an--.

Column 24, Line 34;
"content" should be --contents--.

Column 25, Line 4;
"content" should be --contents--.

Column 25, Line 28;
"CSDU,i)" should be --CSD(j,i)--.

Column 26, Line 14;
"q@h" should be --g@h--.

Column 27, Line 2;
"90214901" should be --90214091--.

UNITED STATES PATENT AND TRADEMARK OFFICE
CERTIFICATE OF CORRECTION

PATENT NO. : 7,493,381 B2
APPLICATION NO. : 10/862888
DATED : February 17, 2009
INVENTOR(S) : Hari Krishna Garg It is certified that error appears in the above-identified patent and that said Letters Patent is hereby corrected as shown below:

Column 28, Line 29;
"q@h" should be --g@h--.

Column 32, Line 28;
After "This", insert --is--.

Column 32, Line 44;
Before "taking", insert --'--.

Column 32, Line 45;
"number" should be --numbers--.

Column 33, Line 6;
"form" should be --frm--.

Column 33, Line 17;
"form" should be --frm--.

Column 33, Line 25;
After "it", insert --is--.

Column 33, Line 31;
"form" should be --frm--.

Column 33, Line 32;
After "ordinary", insert --conditions--.

Column 33, Line 37;
"form" should be --frm--.

Column 34, Line 18;
"providers" should be --provider's--.

Column 35, Line 56;
"telephony" should be --telephone--.

Column 36, Line 46;
"follow" should be --follows--.

UNITED STATES PATENT AND TRADEMARK OFFICE
CERTIFICATE OF CORRECTION

| | |
|---|---|
| PATENT NO. | : 7,493,381 B2 |
| APPLICATION NO. | : 10/862888 |
| DATED | : February 17, 2009 |
| INVENTOR(S) | : Hari Krishna Garg |

It is certified that error appears in the above-identified patent and that said Letters Patent is hereby corrected as shown below:

Column 36, Line 49;
"address" should be --Address--.

Column 36, Line 61;
"send" should be --sending--.

Column 37, Line 7;
"SPAL" should be --SPA1--.

Column 37, Line 38;
After "will", insert --be--.

Column 38, Line 7;
"maybe" should be --may be--.

Column 38, Line 56;
"describe" should be --described--.

Column 38, Line 59;
"describe" should be --described--.

Column 39, Line 10, Claim 1;
";" should be --:--.

Column 40, Line 7;
After "electronic", insert --address--.

UNITED STATES PATENT AND TRADEMARK OFFICE
CERTIFICATE OF CORRECTION

PATENT NO. : 7,493,381 B2
APPLICATION NO. : 10/862888
DATED : February 17, 2009
INVENTOR(S) : Hari Krishna Garg It is certified that error appears in the above-identified patent and that said Letters Patent is hereby corrected as shown below:

Column 42, Line 14;
";" should be --:--.

Signed and Sealed this

Eleventh Day of August, 2009

David J. Kappos
*Director of the United States Patent and Trademark Office*